US012732252B2

(12) United States Patent
Mishra et al.

(10) Patent No.: US 12,732,252 B2
(45) Date of Patent: Sep. 8, 2026

(54) SYSTEM AND METHOD OF DETECTING ENVIRONMENTAL CHANGES USING WIRELESS SENSING

(71) Applicant: NEWSOUTH INNOVATIONS PTY LIMITED, Sydney (AU)

(72) Inventors: Deepak Mishra, Sydney (AU); Aruna Seneviratne, Sydney (AU)

(73) Assignee: NEWSOUTH INNOVATIONS PTY LIMITED, Sydney (AU)

( * ) Notice: Subject to any disclaimer, the term of this patent is extended or adjusted under 35 U.S.C. 154(b) by 244 days.

(21) Appl. No.: 18/696,831

(22) PCT Filed: Sep. 29, 2022

(86) PCT No.: PCT/AU2022/051163
§ 371 (c)(1),
(2) Date: Mar. 28, 2024

(87) PCT Pub. No.: WO2023/049962
PCT Pub. Date: Apr. 6, 2023

(65) Prior Publication Data

US 2024/0396609 A1 Nov. 28, 2024

(30) Foreign Application Priority Data

Oct. 1, 2021 (AU) ................................ 2021903157

(51) Int. Cl.

| | |
|---|---|
| ***H04B 7/06*** | (2006.01) |
| ***G08B 17/12*** | (2006.01) |
| *G06F 18/27* | (2023.01) |

(52) U.S. Cl.
CPC .......... *H04B 7/0626* (2013.01); *G08B 17/12* (2013.01); *G06F 18/27* (2023.01)

(58) Field of Classification Search
CPC .......... G06F 18/00; G06F 18/27; G06F 30/27; G06N 3/02; G06N 3/08; G06N 20/00;
(Continued)

(56) References Cited

U.S. PATENT DOCUMENTS

| | | | | |
|---|---|---|---|---|
| 10,002,510 | B2 * | 6/2018 | Ryder | G08B 17/00 |
| 11,546,035 | B2 * | 1/2023 | Wei | G06V 20/52 |

(Continued)

FOREIGN PATENT DOCUMENTS

| | | | |
|---|---|---|---|
| CN | 105761407 | A | 7/2016 |
| CN | 107025751 | A | 8/2017 |

(Continued)

OTHER PUBLICATIONS

Gaur, et al., "Fire Sensing Technologies: A Review", IEEE Sensors Journal, vol. 19, No. 9, May 1, 2019, pp. 3191-3202.

(Continued)

*Primary Examiner* — Shawkat M Ali
(74) *Attorney, Agent, or Firm* — Myers Bigel, P.A.

(57) ABSTRACT

A method of using a trained classifier to detect a change in temperature or an environmental cause of a change in temperature. The classifier is trained to detect a change in temperature by extracting channel signal information (CSI) amplitudes for each of a plurality of wireless networking signals received at a wireless communication device, each signal associated with a change in temperature and for each signal, analysing subcarriers of the extracted CSI amplitudes and determining a relationship between amplitude and temperature. The training comprises selecting a subset of the plurality of subcarriers based on the determined relationship; and training the classifier using the CSI amplitudes of the selected subcarriers. The trained classifier is provided with a selected subset of carriers of CSI amplitudes extracted for each of a plurality of wireless networking signals received at (Continued)

a wireless communication device to determine if a change in temperature has occurred.

20 Claims, 14 Drawing Sheets

(58) Field of Classification Search
CPC ........ G06N 20/10; G08B 17/10; G08B 17/12; G08B 25/10; H04B 7/06; H04B 7/0626; H04B 17/12; H04B 17/23; H04B 27/309; H04L 25/02; H04L 27/36; H04L 43/08; H04W 4/38; H04W 4/90; H04W 16/28; H04W 72/12; H04W 72/0453; H04W 84/12
USPC ................................ 375/219, 295, 316, 377
See application file for complete search history.

(56) References Cited

U.S. PATENT DOCUMENTS

| | | | | |
|---|---|---|---|---|
| 11,626,002 | B2 * | 4/2023 | Donegan | G08B 29/188 340/540 |
| 2021/0211174 | A1 | 7/2021 | Wei et al. | |

FOREIGN PATENT DOCUMENTS

| | | | |
|---|---|---|---|
| CN | 109951413 | A | 6/2019 |
| CN | 110059567 | A | 7/2019 |
| WO | 2017117910 | A1 | 7/2017 |
| WO | 2018161433 | A1 | 9/2018 |

OTHER PUBLICATIONS

Guidara, et al., "Impacts of Temperature and Humidity variations on RSSI in indoor Wireless Sensor Networks", Procedia Computer Science, 22nd International Conference on Knowledge-Based and Intelligent Information & Engineering Systems, vol. 126, Aug. 28, 2018, pp. 1072-1081.

Luomala, et al., "Effects of Temperature and Humidity on Radio Signal Strength in Outdoor Wireless Sensor Networks", Proceedings of the Federated Conference on Computer Science and Information Systems (FedCSIS), Lodz, Poland, Sep. 13, 2015, pp. 1247-1255.

Muhammad, et al., "Efficient Fire Detection for Uncertain Surveillance Environment", IEEE Transactions on Industrial Informatics, vol. 15, No. 5, May 2019, pp. 3113-3122.

Zheng, et al., "Smokey: Ubiquitous Smoking Detection with Commercial WiFi Infrastructures", IEEE INFOCOM 2016—The 35th Annual IEEE International Conference on Computer Communications, San Francisco, CA, Apr. 10, 2016, 9 pp.

"International Search Report and Written Opinion of the International Searching Authority", International Application No. PCT/AU2022/051163, Nov. 30, 2022, 10 pp.

Sharma, Aryan , et al., "A Novel Approach to Channel Profiling Using the Frequency Selectiveness of WiFi CSI Samples", GLOBECOM 2020—2020 IEEE Global Communications Conference, Taipei, Taiwan, Dec. 7, 2020, 6 pp.

Zhong, Shuxin , et al., "Wi-fire: Device-free fire detection using WiFi networks", 2017 IEEE International Conference on Communications (ICC), May 21, 2017, 6 pp.

Extended European Search Report corresponding to EP 22873991.8; Dated: Jul. 30, 2025, (12 pp).

Examination report under sections 12 & 13 of the Patents Act, 1970 and the Patents Rules, 2003, Indian Application No. 202417029302, Jun. 18, 2026, 8 pp.

* cited by examiner

SYSTEM AND METHOD OF DETECTING ENVIRONMENTAL CHANGES USING WIRELESS SENSING

RELATED APPLICATIONS

This application is a 35 U.S.C. § 371 national stage application of PCT Application No. PCT/AU2022/051163, filed on Sep. 29, 2022, which itself claims priority from Australian Patent Application No. 2021903157, filed on Oct. 1, 2021, the contents of which are incorporated herein by reference in their entireties. The above-referenced PCT International Application was published in the English language as International Publication No. WO 2023/049962 A1 on Apr. 6, 2023.

TECHNICAL FIELD

The present invention relates generally to detecting environmental changes, such as increases in temperature and causes of changes in temperature such as presence of fire. In particular, the arrangements described relate to using wireless communications signals to detect the environmental changes. The present invention also relates to a method and apparatus for detecting environmental changes using wireless communications channel state information, and to a computer program product including a computer readable medium having recorded thereon a computer program for detecting environmental changes using wireless communications channel state information.

BACKGROUND

Early detection of fires is highly important to prevent injury, loss of life and damage to properties. Fire detection is traditionally implemented using fire-specific devices such as smoke alarms or smoke detectors. The fire-specific devices often require testing, maintenance and battery upkeep. If a traditional smoke detector is out of order, or not installed in a property to begin with, the consequences in terms of safety and damage may be serious.

Common types of smoke alarm technology use ionization and photoelectric sensors. A shortcoming of ionization and photoelectric technologies is their inherent approach to sensing smoke as an indicator of fire since fires can cause damage before the smoke reaches detectable levels. The existing approaches target the main features of fire, namely the visible flame, the presence of carbon dioxide, heat due to exothermic combustion, and smoke.

Fires can be associated with changing environmental conditions such as change in temperature and the like. Distinguishing effects of changes in environmental conditions from detection of fire can also be problematic As use of Internet of Things (IoT) devices has become increasingly common, broad industry research into detecting human presence or movement in a space has been conducted. Limited investigation into whether common IoT devices can be used to detect environmental changes such as fire detection has been conducted. Some industry research has been conducted into using Received Signal Strength Indicator (RSSI) signals from wireless communication transmissions for detecting environmental changes. While RSSI has been shown to show a proportional reaction to environmental changes, limited accuracy and reliability has been observed.

SUMMARY

It is an object of the present invention to substantially overcome, or at least ameliorate, one or more disadvantages of existing arrangements.

The arrangements described relate to using wireless communications channel state information signals to determine presence of a fire in an indoor space.

According to a first aspect of the present disclosure, there is provided a method of training a classifier to detect a change in temperature, the method comprising: extracting channel signal information (CSI) amplitudes for each of a plurality of wireless networking signals received at a wireless communication device, each signal associated with a change in temperature; for each signal, analysing each of a plurality of subcarriers of the extracted CSI amplitudes and determining a relationship between amplitude and temperature; selecting a subset of the plurality of subcarriers based on the determined relationship between amplitude and temperature; and training the classifier to detect a change in temperature using the CSI amplitudes of the selected subcarriers for each of the received signals and the associated in temperature.

According to another aspect of the present disclosure, there is provided a method of detecting a change in temperature, the method comprising: extracting channel signal information (CSI) amplitudes for a wireless networking signal received at a wireless communication device; selecting, from a plurality of subcarriers of the extracted CSI amplitudes, a subset of subcarriers, the selection based on a previously determined relationship between amplitude and temperature; and providing the CSI amplitudes of the selected subcarriers to a classifier trained to determine whether a change in temperature has occurred.

According to another aspect of the present disclosure, there is provided a method of training a classifier to detect an environmental cause for a change in temperature, the method comprising: receiving, at a wireless communication device, a plurality of wireless networking signals and extracting channel signal information (CSI) amplitudes for each signal, each signal associated with a change in temperature and one of presence or absence of the environmental cause; for each signal, analysing each of a plurality of subcarriers of the extracted CSI amplitudes and determining a relationship between amplitude and temperature; selecting a subset of the plurality of subcarriers based on the determined relationship between amplitude and temperature; and training the classifier to detect if the cause is present using the CSI amplitudes of the selected subcarriers for each of the received signals, the associated change in temperature and presence or absence of the environmental cause.

Another aspect of the present disclosure provides a method of training a classifier to detect an environmental cause for a change in temperature, the method comprising: extracting channel signal information (CSI) amplitudes for each of a plurality of wireless networking signals received at a wireless communication device, each signal associated with a change in temperature and one of presence or absence of the environmental cause; for each signal, analysing each of a plurality of subcarriers of the extracted CSI amplitudes and determining a relationship between amplitude and temperature; selecting a subset of the plurality of subcarriers based on the determined relationship between amplitude and temperature; and training the classifier to detect if the cause is present using the CSI amplitudes of the selected subcarriers for each of the received signals, the associated change in temperature and presence or absence of the environmental cause.

Another aspect of the present disclosure provides a method of detecting an environmental cause of a change in temperature, the method comprising: extracting channel signal information (CSI) amplitudes for a wireless networking signal received at a wireless communication device; selecting, from a plurality of subcarriers of the extracted CSI amplitudes, a subset of subcarriers, the selection based on a previously determined relationship between amplitude and temperature; and providing the CSI amplitudes of the selected subcarriers to a classifier trained to determine if the cause is present.

Another aspect of the present disclosure provides apparatus comprising: a wireless communication device; a processor; and a memory storing instructions executable on the processor to implement a method of training a classifier to detect an environmental cause for a change in temperature, the method comprising: extracting channel signal information (CSI) amplitudes for each of a plurality of wireless networking signals received at the wireless communication device, each signal associated with a change in temperature and one of presence or absence of the environmental cause; for each signal, analysing each of a plurality of subcarriers of the extracted CSI amplitudes and determining a relationship between amplitude and temperature; selecting a subset of the plurality of subcarriers based on the determined relationship between amplitude and temperature; and training the classifier to detect if the cause is present using the CSI amplitudes of the selected subcarriers for each of the received signals, the associated change in temperature and presence or absence of the environmental cause.

Another aspect of the present disclosure provides a non-transitory computer readable medium computer-readable storage medium which stores a program for executing a method of training a classifier to detect a change in temperature, the method comprising: extracting channel signal information (CSI) amplitudes for each of a plurality of wireless networking signals received at a wireless communication device, each signal associated with a change in temperature; for each signal, analysing each of a plurality of subcarriers of the extracted CSI amplitudes and determining a relationship between amplitude and temperature; selecting a subset of the plurality of subcarriers based on the determined relationship between amplitude and temperature; and training the classifier to detect a change in temperature using the CSI amplitudes of the selected subcarriers for each of the received signals and the associated in temperature Another aspect of the present disclosure provides a system for detecting an environmental cause of a change in temperature, the system comprising: a wireless receiver device; a processor; and a memory storing a trained classifier and instructions executable on the processor to implement a method comprising: extracting channel signal information (CSI) amplitudes for a wireless networking signal received at the wireless communication device; selecting, from a plurality of subcarriers of the extracted CSI amplitudes, a subset of subcarriers, the selection based on a previously determined relationship between amplitude and temperature; and providing the CSI amplitudes of the selected subcarriers to the trained classifier determine the environmental cause.

Other aspects are also disclosed.

BRIEF DESCRIPTION OF THE DRAWINGS

Some aspects of the prior art and at least one embodiment of the present invention will now be described with reference to the drawings, in which.

DETAILED DESCRIPTION INCLUDING BEST MODE

Figure 1:
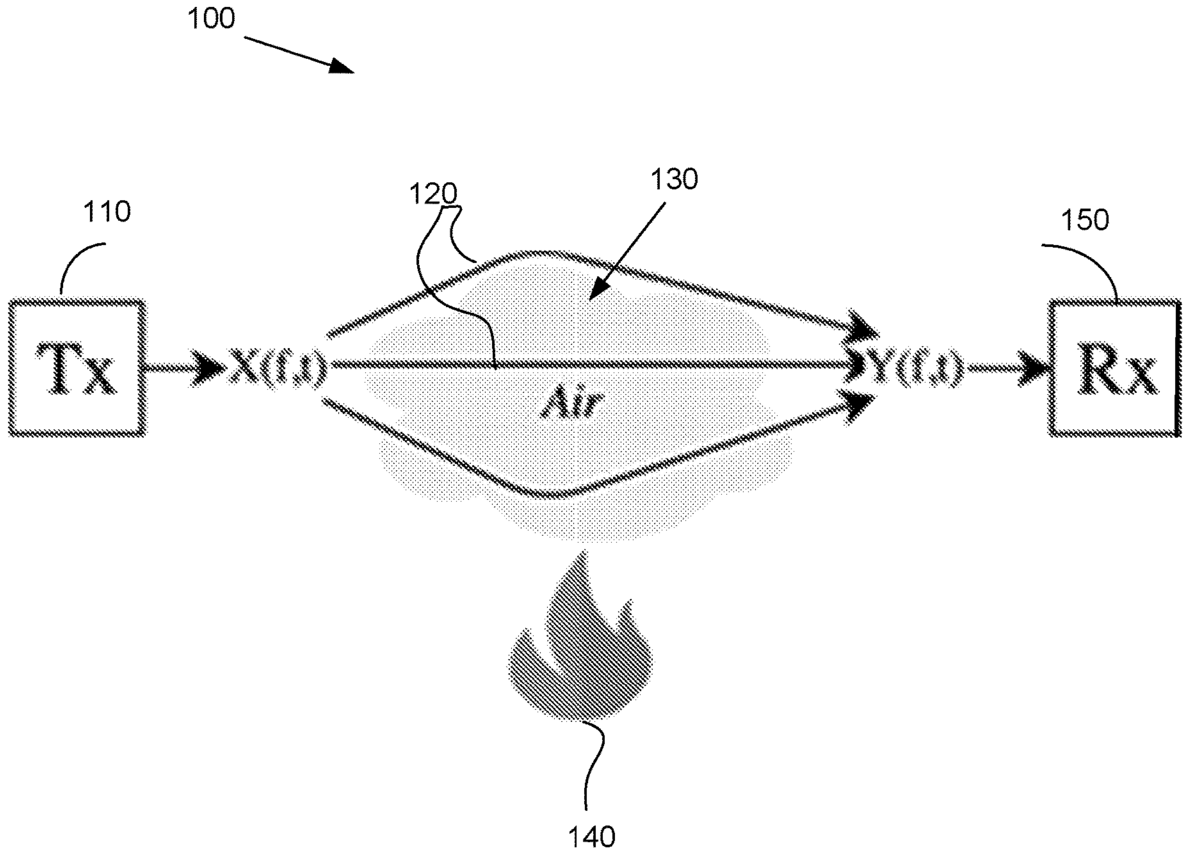
FIG. 1 shows a system for detecting presence of fire or change in temperature.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or the patent applicant that such documents or devices in any way form part of the common general knowledge in the art.

The arrangements described herein relate to detecting changes in temperature, and correspondingly presence of fire, by collecting and analysing a parameter of wireless communication known as channel state information (CSI). The CSI parameter represents a quantitative measure of the propagation of a wireless signal from a transmitter to a receiver and is provided to adapt wireless transmissions to the prevailing signal propagation conditions. In the case of the IEEE 802.11n/ac/ax wireless networking (known as Wi-Fi™ and generally referred to herein for brevity as "WiFi") using Orthogonal Frequency Division Multiplexing (OFDM), for example, a receiver can estimate CSI from the physical (PHY) layer frame preamble, enabling frame-by-frame measurement of the frequency response of the corresponding wireless communications channel.

Internet of things (IoT) devices are becoming pervasive, with an estimated 30 billion WiFi devices in use. Research has been conducted into the ability to leverage the increased presence of IoT devices to attain greater control and information over the environments of use. WiFi Channel State Information (CSI) has been used in the sensing domain to profile physical environments and passively detect human occupancy and behaviours. A domain in which there has been limited application is in the monitoring of atmospheric conditions, such as temperature. Ambient temperature is a useful environmental metric to monitor in terms of human sensitivities. Further, industrial and commercial processes can be sensitive to environmental conditions or have their own impact on ambient temperature. Monitoring temperature and presence of fire can be particularly useful in environments such as data centres, where performance is closely related to operating temperature.

WiFi sensing pertains to the use of WiFi transmissions to profile a propagation channel based on how the channel attenuated, delayed and scattered a transmitted WiFi packet. Initial industry research predominantly used a Received Signal Strength Indicator (RSSI) metric for sensing. More recent industry research has indicted that Channel State Information (CSI) can be a more useful metric as CSI captures multipath fading with finer granularity and less noise, allowing for the more robust WiFi sensing. Industry sensing applications include human activity monitoring, occupancy counting gesture recognition following removal of high frequency noise. Industry research has additionally been found that outlier removal techniques, such as a Hampel filter, can be necessary for removing burst noises which occur due to random changes in transmission power. Temporal analysis techniques such as Principle Component Analysis (PCA), Wavelet transforms and FFT techniques have been useful for extracting features relating to human activity. The extracted features have been successfully used to train supervised machine learning classifiers such as Support Vector Machines (SVM) as well as neural networks.

While use of WiFi for detecting human changes in a channel has been broadly researched, detecting atmospheric changes has been less common. Some previously published techniques found that temperature rises caused a decrease in RSSI for a test case conducted outdoors with specialised devices. A negative correlation between RSSI and temperature has been shown an indoor environment, but without accuracy with increasing transmitter-receiver separation. The arrangements described used CSI and study correlation between CSI and temperature for temperature and fire sensing.

Fire generally relates to visible combustion, where a fuel undergoes exothermic reaction with oxygen that produces new molecules, such as carbon dioxide, and flame is a visible indicator of this chemical process. Flame comprises a mixture of gases, often with visibly yellow colour representing energized carbon. This displacement of gases from the combustion process introduces dynamic changes to a wireless channel, which has the potential to affect dynamic signal paths of wireless transmissions. Additionally, the flame region itself is electrically conductive due to the creation of charged ions in the chemical combustion process as well as the physical ionisation of molecules due to heat. The increased electrical conductivity of the propagation channel has the potential to interfere with the propagation of electromagnetic signals. The arrangements described herein analyse the changes in propagation using CSI.

Additionally, fire usually introduces heat into a transmission channel. A resultant increase in temperature may cause detectable artefacts on CSI due to a drop in humidity or an increase in particle energy. Temperature is proportional to the motion of air particles, and heating air will cause an average increase in the amount of energy and hence the velocity of air particles. As CSI is dependent on a transmission channel's dynamic signal path, the arrangements described investigate small scale changes to molecular velocity in the physical environment and the resultant effect on the underlying CSI signatures.

Further, higher atmospheric temperature can cause increased electron vibration and hence noise in electronic devices, such as network cards using WiFi signals to determine presence of a fire. As WiFi has become ubiquitous, WiFi transceivers have become common items in households, offices, data centres, commercial premises and the like. The arrangements described use CSI properties or signatures on the basis that the increased kinetic energy of ambient gas particles will affect the wireless link.

FIG. 1 shows an example system 100 for detecting fire and/or change of temperature according to the arrangements described. The system 100 includes a transmitter ("Tx") device 110 and a receiver ("Rx") device 150. The transmitter device 110 may be any device capable of transmitting WiFi networking signals (for example IEEE 802.11n/ac/ax), such as a network card or the like, implemented either as a standalone device or integrated into a larger device such as a personal computer, laptop, server or the like. The receiver device 150 may be any device capable of receiving WiFi networking signals (for example IEEE 802.11n/ac/ax), such as a network card or the like, and capable of extracting CSI amplitude signals from the packets received. For example, the receiver 150 can have a CSI extraction program such as Nexmon CSI, CSI TOOLS™ and the like. The receiver device 150 can implemented either as a standalone device or integrated into a larger device such as a personal computer, laptop, server or the like. WiFi signals (such as signals 120) are transmitted from the transmitter device 110 and propagated through a channel 130 (atmosphere). The propagated signals 120 are received at the receiver device 150. A disruption in temperature in the channel 130 (for example by operation of a heat source 140 such as fire) disrupts a propagation and paths of the signals 120 through the channel 130.

The transmission of the signals 120 through the channel 130 is represented as Equation (1) below.

$$Y(f,t) = H(f,t) \times (f,t) + N(f,t) \quad (1)$$

In Equation (1), for each subcarrier frequency f and time t a received signal Y is equal to a corresponding transmitted signal X, transformed by the channel H and influenced by noise N. The domain of f is the set of OFDM subcarriers which underpin the wireless transmission, and tis the interval over which transmission occurs. H is represented CSI, and the transformation encompasses multipath fading, scattering and attenuation. In CSI sensing systems, the receiver (150) is equipped with software that can extract H from the received signals. More specifically, H(f, t) can be expressed as Equation (2)

$$H(f,t) + H_s(f,t) + \sum_{k \in P} a_k(f,t) e^{\frac{-j2\pi d_k(0)+v_k t}{\lambda}} \quad (2)$$

In Equation (2) the total transformation H(f, t) is considered to be a combination of the transformation by the static signal path, $H_s(f, t)$ and the summation of the dynamic paths P. The response of each path k is dependent on the attenuation on that path, $a_k$, the distance between transmitter (110) and receiver (150) $d_k$, the velocity of path length change $v_k$, and the wavelength of the signal $\lambda$. In an arrangement of the system 100 implemented by the inventors, the channel 130 H(f, t) is occupied by air comprised of 78% Nitrogen, 21% Oxygen and the remaining 1% is comprised of gases such as Carbon Dioxide, Hydrogen and Neon. The molecules forming the air channel have mass m, and are in random motion with velocity v, colliding with each other and objects around them. Each of the molecules has kinetic energy $$E_{kinetic}[n] = \frac{1}{2}mv^2.$$

The average kinetic energy $E_{average}$ of air for N particles is determined according to Equation (3).

$$E_{average} = \sum_{n=1}^{N} \frac{E_{kinetic}[n]}{N} \tag{3}$$

Average temperature T is determined using Equation (4):

$$T = \frac{2}{3\kappa} E_{average} \tag{4}$$

In Equation (4) c is the Boltzmann constant, and $E_{average}$ is the average kinetic energy of the molecules comprising the air. As shown, temperature is proportional to the motion of air particles, and heating the air will cause an average increase in the amount of energy and hence the velocity of air particles. Referring again to Equation (2), CSI is dependent on the dynamic signal path. Accordingly, small scale changes to molecular velocity in the physical environment are expected to influence CSI. This can be thought of as similar to a human sensing model, where human motion changes CSI. In the present arrangements, particle motion changes CSI. Furthermore, an average increase in temperature may result in less dense spatial distribution of particles, which represents a change in the static signal path 130. An additional aspect of the temperature sensing model of Equation (4) is consideration for thermal noise. Increased atmospheric temperature can cause increased electron vibration and hence noise in electronic devices, such as a network card of the receiver 150. Tropospheric ducting, a process by which temperature differential between the atmosphere and ground causes RF signal enhancement, is another way that temperature may affect CSI.

In developing the invention, experimental tests were conducted in a controlled environment. The experiments were conducted to detect temporal changes in temperature using CSI signatures of different 5 GHz WiFi subcarriers.

Figure 2A:
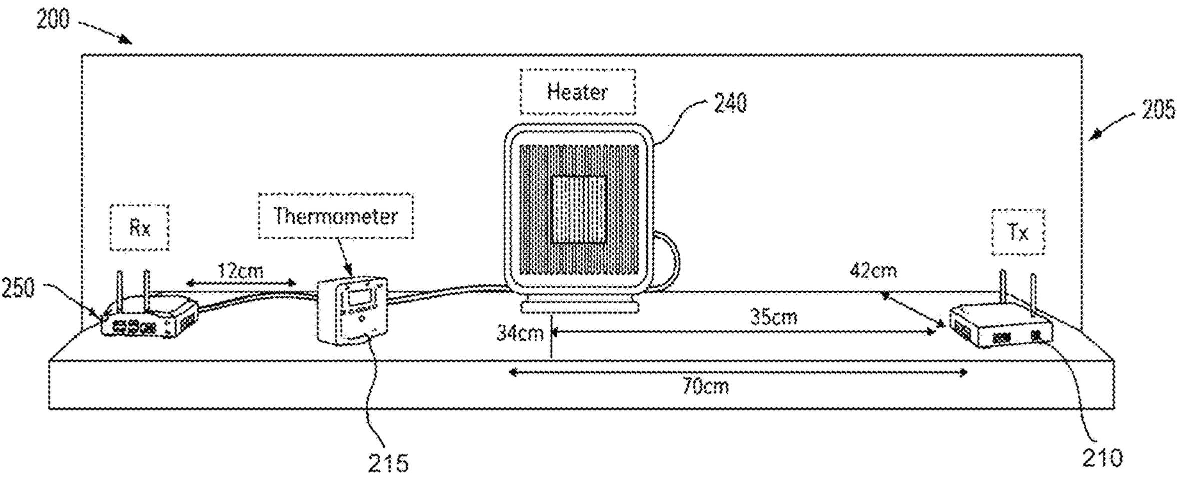
FIGS. 2A and 2B show a test case implementation of the system of FIG. 1.

FIG. 2A shows a testbench arrangement 200 of the system 100 used in the experiments conducted. The arrangement 200 was implemented in a computer laboratory representative of a real world environment. Experiments were conducted using the arrangement 200 without human presence to limit channel interference.

The arrangement 200 was implemented in a closed space 205, a cupboard. A transmitter 210 corresponds to the transmitter 110. A receiver 250 corresponds to the receiver 150. Each of the transmitter 210 and receiver 250 devices comprises a Raspberry Pi™ 4B device on channel 36 at 5180 MHz with 40 MHz bandwidth. The channel incorporates 104 subcarriers, indexing from −58 to +58 except +−32 and −5 to 5. The transmission was configured such that the transmitter 210 sends out 800 ping packets to an access point ("AP") set up outside the cupboard 205 and not visible in FIG. 2A. The receiver 250 has Nexmon CSI software installed is able for enabling passive CSI amplitude collection for the channel between the transmitter 210 and the receiver 250 itself from transmitted packets.

Figure 2B:
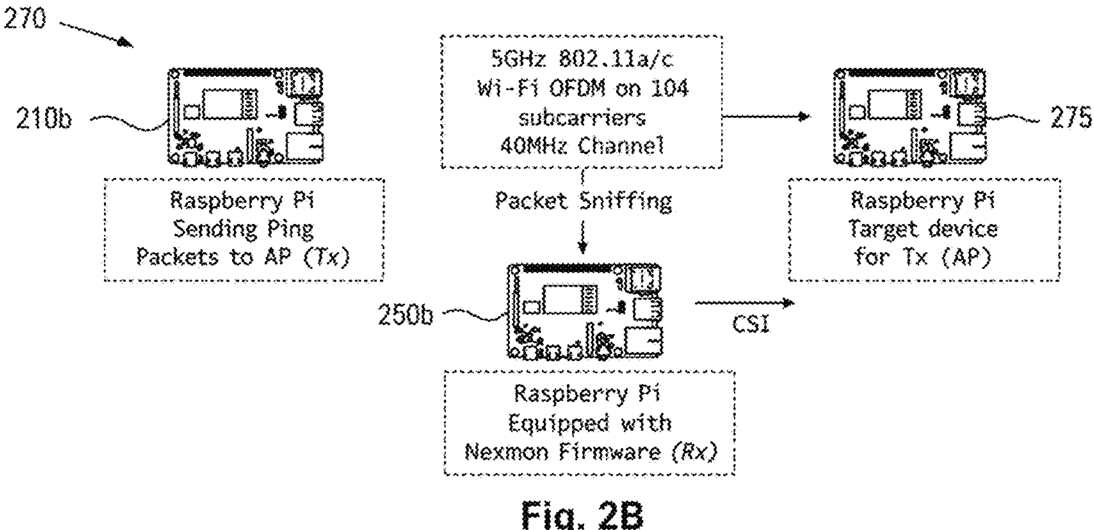

FIG. 2B shows a sample architecture 270 used in the arrangement 200. The architecture 270 includes a transmitter 210*b*, a receiver 250*b* and an access point 275. The transmitter 210*b*, corresponding to the transmitter 210, is a Raspberry Pi™ transmitting packets at 5 GHz using 802.11a/con 104 subcarriers of the 40 MHz Channel to the access point ("AP") 275. The AP 275 is also a Raspberry Pi™ device outside of the cupboard. The receiver 250*b*, corresponding to the receiver 250, is Raspberry Pi™ device equipped with Nexmon firmware which detects transmissions from the device 210*b* and extracts a CSI reading. The CSI amplitudes of the channel between the transmitter (Tx) 210*b* and the AP 275 are generated without the transmitter 210*b* directly communicating with the receiver 250*b* (active as a (passive) receiver).

Returning to FIG. 2A, to measure the ambient temperature, a regular household thermometer 215 measures atmospheric temperature and a Raspberry Pi™ camera model attached to the receiver 250 records the temperature reading with picamera-1 utility. At the same time, a function vcgencmd was used to measure temperature utility on the receiver 250 to measure the receiver's device core temperature.

The hardware device specifications used in the experiments are listed in Table 1 below.

TABLE 1

Experimental hardware specifications

| Hardware | Specification |
|---|---|
| Heater 240 | Altise ceramic fan heater 2000 W power consumption |
| Tx (210/210b) | Raspberry Pi ™ 4B |
| Rx (250/250b) | Raspberry Pi ™ 4B with Nexmon CSI [22] installed |
| AP (275) | Raspberry Pi ™ 4B using hostapd utility |
| Thermometer (215) | Gove household thermometer, ±0.3° C. precision |

In implementation of the testbench 200, both the temperature readings and CSI amplitude measurement were initiated when the heater 240 (equivalent to the heat source 140) was turned on, and with the cupboard doors closed to form a closed space. During the experimental trials, the test area was clear of humans and any moving objects. The heater 240 had a thermal protection feature that automatically shut down when the internal temperature exceeded the heater's operating range. During the experiments, the heater 240 shut down when the ambient temperature reached about 34° C., which can be observed in FIG. 5, as discussed hereafter with respect to FIG. 4.

In implementing the testbench arrangement 200, the magnitude of the raw complex valued CSI for all 104 subcarrier timeseries was determined from WiFi signals detected at the receiver 250. The main sources of noise identified in literature were high frequency variation in CSI amplitude, and amplitude spikes due to sporadic changes in transmission power of the WiFi transmitter 210. Filters were used to remove potential noise. The parameters of the filters were selected so that the filtered CSI amplitude had reduced high frequency noise, while preserving any change induced by the varying temperatures. In the experiments conducted lowpass and Hampel filters were applied independently to the CSI amplitude timeseries for each OFDM subcarrier to eliminate sources of noise causing high-frequency variation in CSI amplitude. Spikes in CSI amplitude due to sporadic changes in transmission power of the WiFi transmitter 210 were removed by employing a lowpass filter with a cut-off frequency of 10 Hz, and a Hampel filter with window lengths of 5 to 11. Other filtering methods could also be used once suitable for removing relatively high frequency noise, typically having cut-off frequencies at around 10% of the sampling rate. Commercially available filters such as those available in MATLAB™ may alternatively be used.

The CSI amplitudes following Hampel filtering were used for time-frequency analysis to investigate noise in the CSI amplitudes extracted at the receiver 250. The CSI amplitudes were subsequently lowpass filtered, and the filtered result used for investigating the temporal correlation and frequency selectiveness of the underlying CSI magnitudes. In particular, changes in CSI magnitudes across different subcarriers with increasing temperature were assessed to quantify any correlation.

In investigating changing CSI amplitude with the increasing ambient temperature due to the heater output, allowance was also made for changes in the receiver device 250 in some implementations. To correlate observations are due to the ambient temperature instead of changing temperature of the receiver device 250, a core temperature of the receiver device 250 was also recorded. In particular, the noise-removed mean CSI amplitude over all 104 subcarriers was presented together with measured ambient temperature and receiver core temperature.

Figure 4:
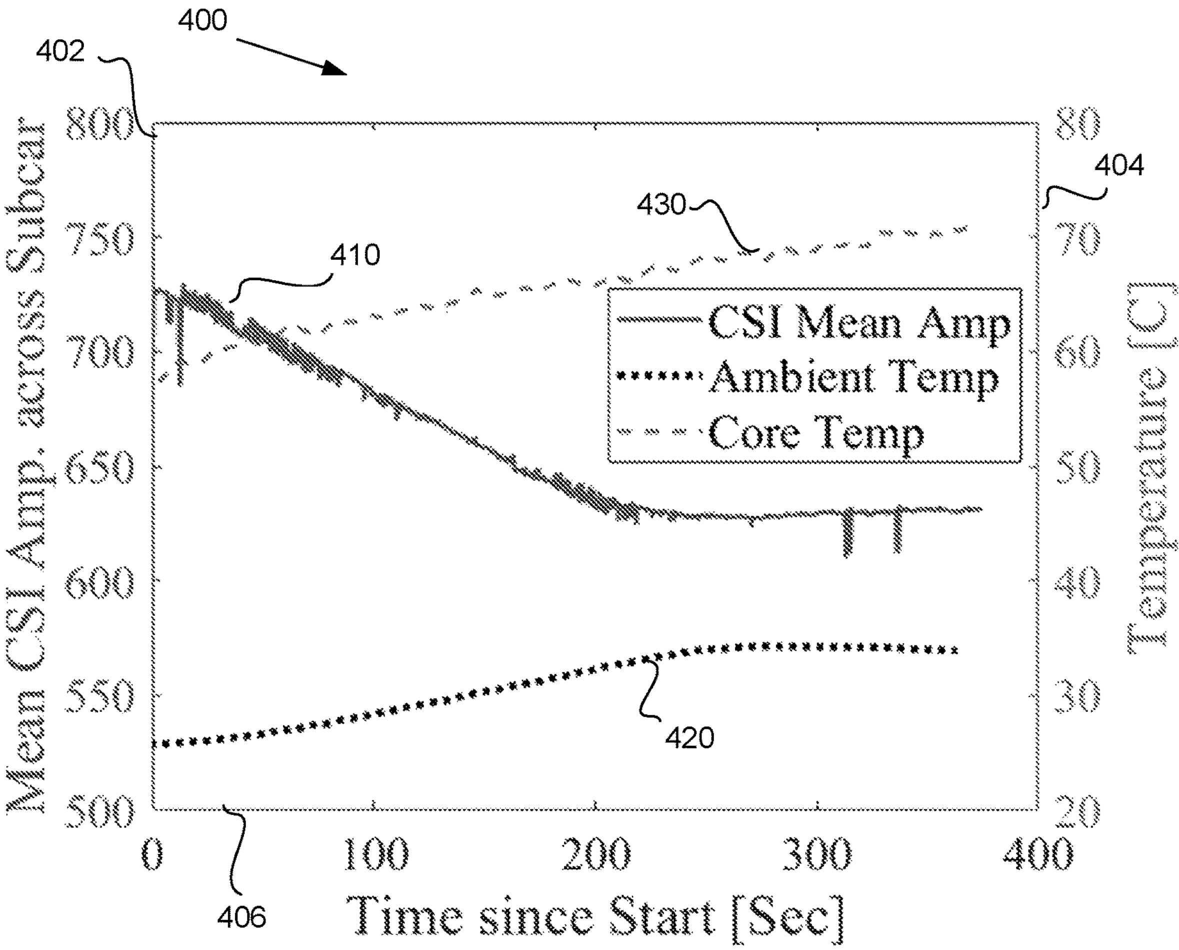
FIG. 4 shows a graph of CSI mean amplitude across subcarrier and measured temperature.

FIG. 4 shows a graph 400 of CSI amplitude (axis 402) and temperature (axis 404) versus time (x-axis 406). The graph 400 shows a mean CSI amplitude 410 across all 104 subcarriers, an ambient temperature signal 420 and a core temperature signal 430. The ambient temperature 420 relates to the temperature in the test area as measured by the thermometer 215. The core temperature 430 relates to the temperature reading for the receiver 250.

As shown in FIG. 4, within the first 250 seconds both the ambient temperature 420 and the core temperature 430 rose relatively gradually, while the mean CSI amplitude value 410 dropped at a consistent rate across subcarriers. After 250 seconds, the heater 240 shut down and the ambient temperature 420 stayed at roughly 34 C. At the same time, the core temperature 430 kept rising and CSI amplitude value remained around 630. Although the core temperature 430 kept rising due to continuous operation of the receiver 250, CSI amplitude 410 instead displays a slight increasing trend due to the stabilising ambient temperature 420.

Having established an observed relationship between CSI amplitude 410 and ambient temperature 420 in FIG. 4, frequency-selectiveness of the CSI amplitudes to change in temperature was reviewed. In analysing frequency-selective behaviours of CSI, mean and variance of CSI amplitude over the experiment duration for each subcarrier was analysed.

Figure 5:
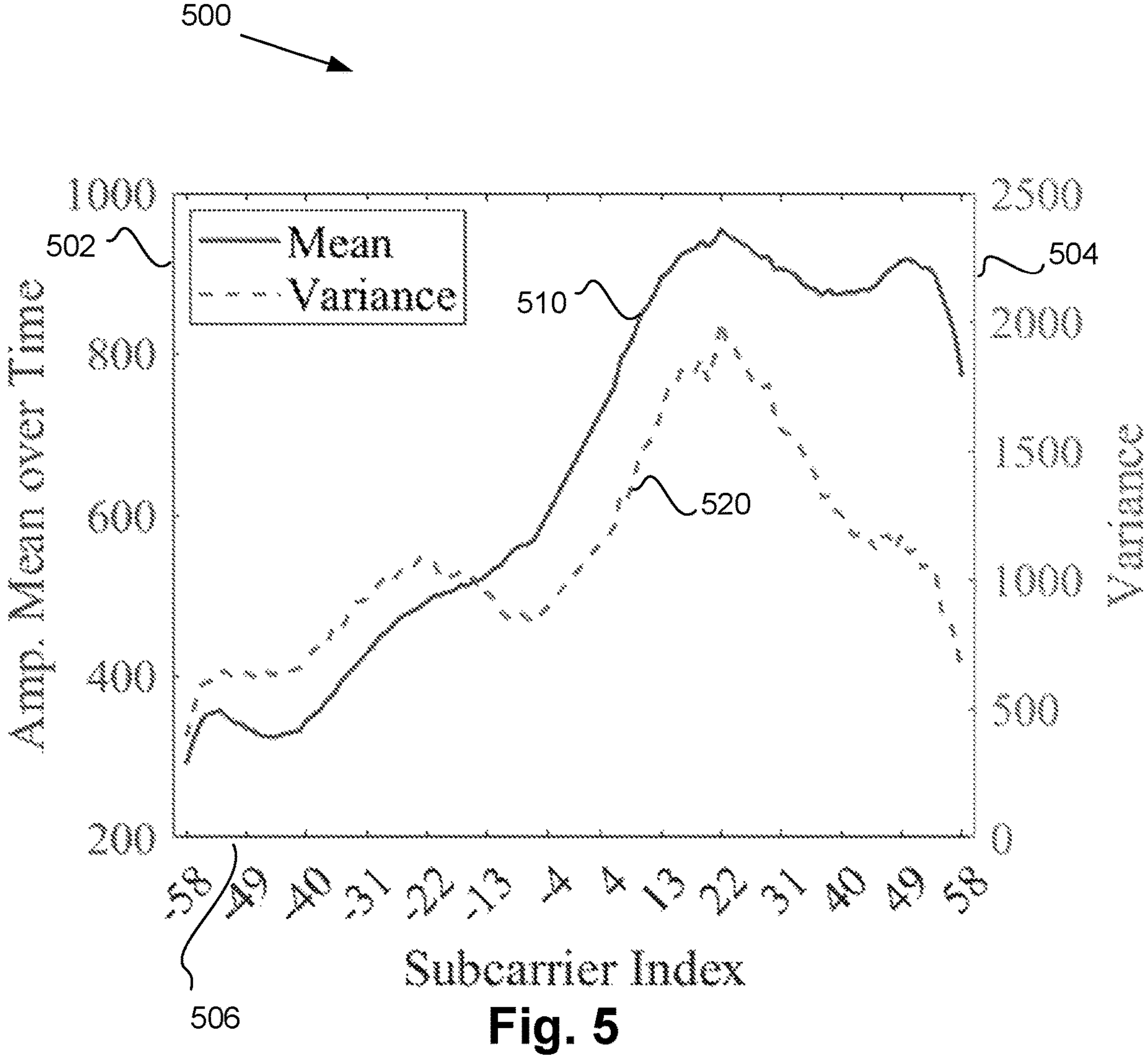
FIG. 5 shows a graph of CSI amplitude mean and variance across time.

FIG. 5 shows a graph 500 charting mean CSI amplitude over time and variance for each subcarrier using the measurements from FIG. 4. An amplitude y-axis 502 shows mean amplitude over time, an axis 504 shows CSI amplitude variance and an x-axis 506 shows subcarrier indices. A signal 510 shows the mean amplitude across the subcarrier indices 506. A signal 520 shows CSI amplitude variance over the subcarrier indices 506.

As shown in FIG. 5, the CSI mean amplitude 510 responds differently across the subcarriers 506. In particular, the amplitude of subcarriers 13 to 31 varies more when the ambient temperature changes, while other the amplitude of other subcarriers varies relatively less. The mean amplitude 510 and amplitude variance 520 are also shown to follow a relatively similar pattern, indicating the CSI subcarrier with higher amplitude also vary more in response to changing ambient temperature.

Figure 6:
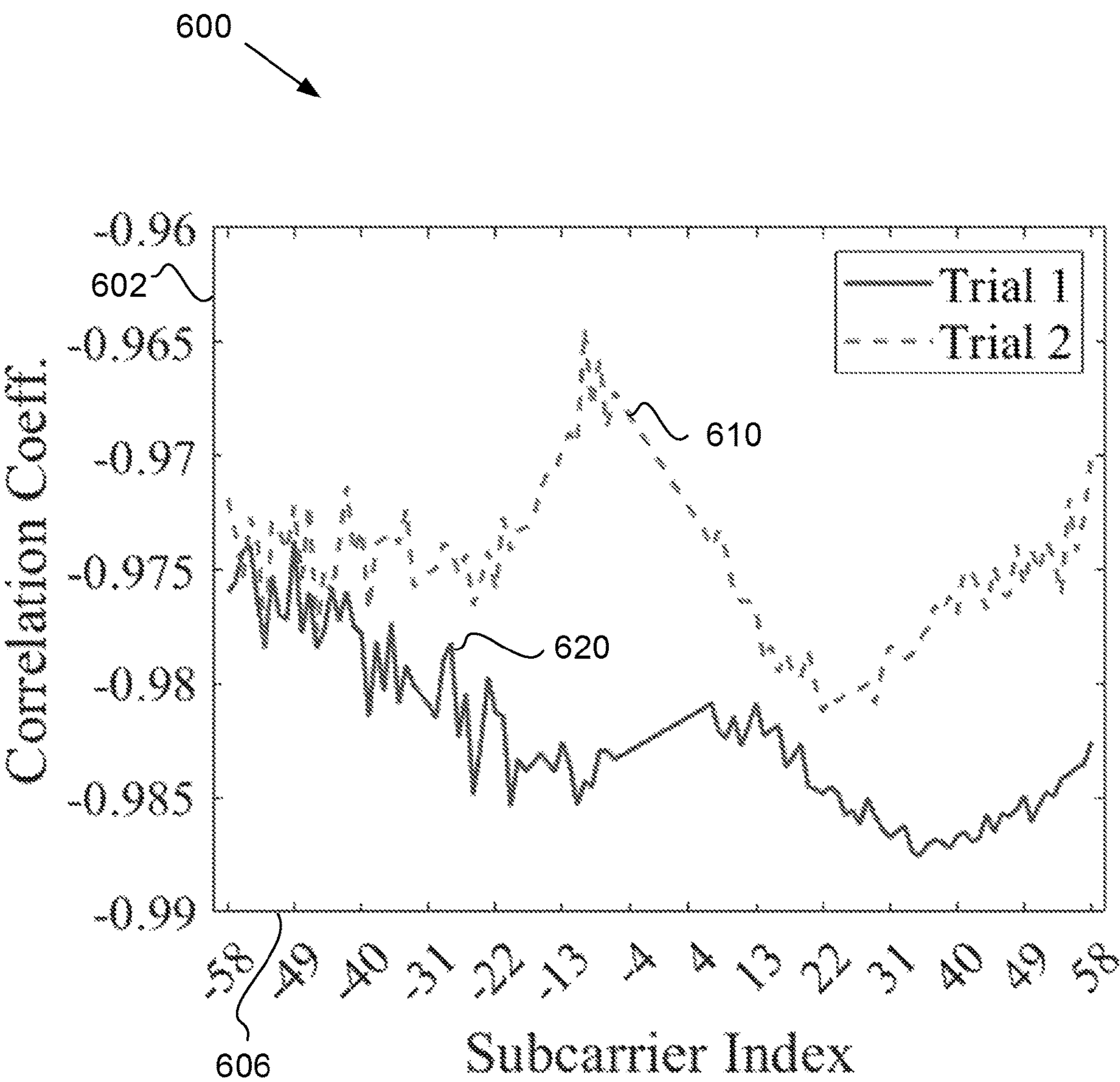
FIG. 6 shows temporal correlation coefficient between CSI amplitude and ambient temperature for each subcarrier.

As shown in FIGS. 4 and 5, CSI amplitude typically decreases as the ambient channel temperature rises, which can be used to determine a correlation coefficient between the CSI amplitude of each subcarrier and the ambient temperature change from two trials. FIG. 6 shows a graph 600 of correlation coefficients (axis 602) determined across subcarrier indices 606. Two different trials were conducted. A signal 610 shows correlation coefficients of trial 1 and signal 620 shows correlation coefficients over trial 2. As shown in FIG. 6, CSI amplitude of each subcarrier and the ambient temperature are highly negatively correlated in both trials, with all the correlation coefficients falling within [−0.96, −0.99]. In both trials, subcarriers 13 to 31 were observed to be more reactive/correlated to the ambient temperature change than other subcarriers.

As described above, filtered, normalised CSI amplitude data with zero mean, and ambient temperature data from two trials were combined to establish different fitting models. As described in relation to FIGS. 4-6, there are subcarriers which are relatively more sensitive to the changing ambient temperature. To further investigate CSI frequency-selectiveness properties, subcarriers −58, 6, 22 and 58 were selected to establish different curve fittings to the CSI amplitude and the ambient temperature and evaluate frequency-selective responses.

Figure 7:
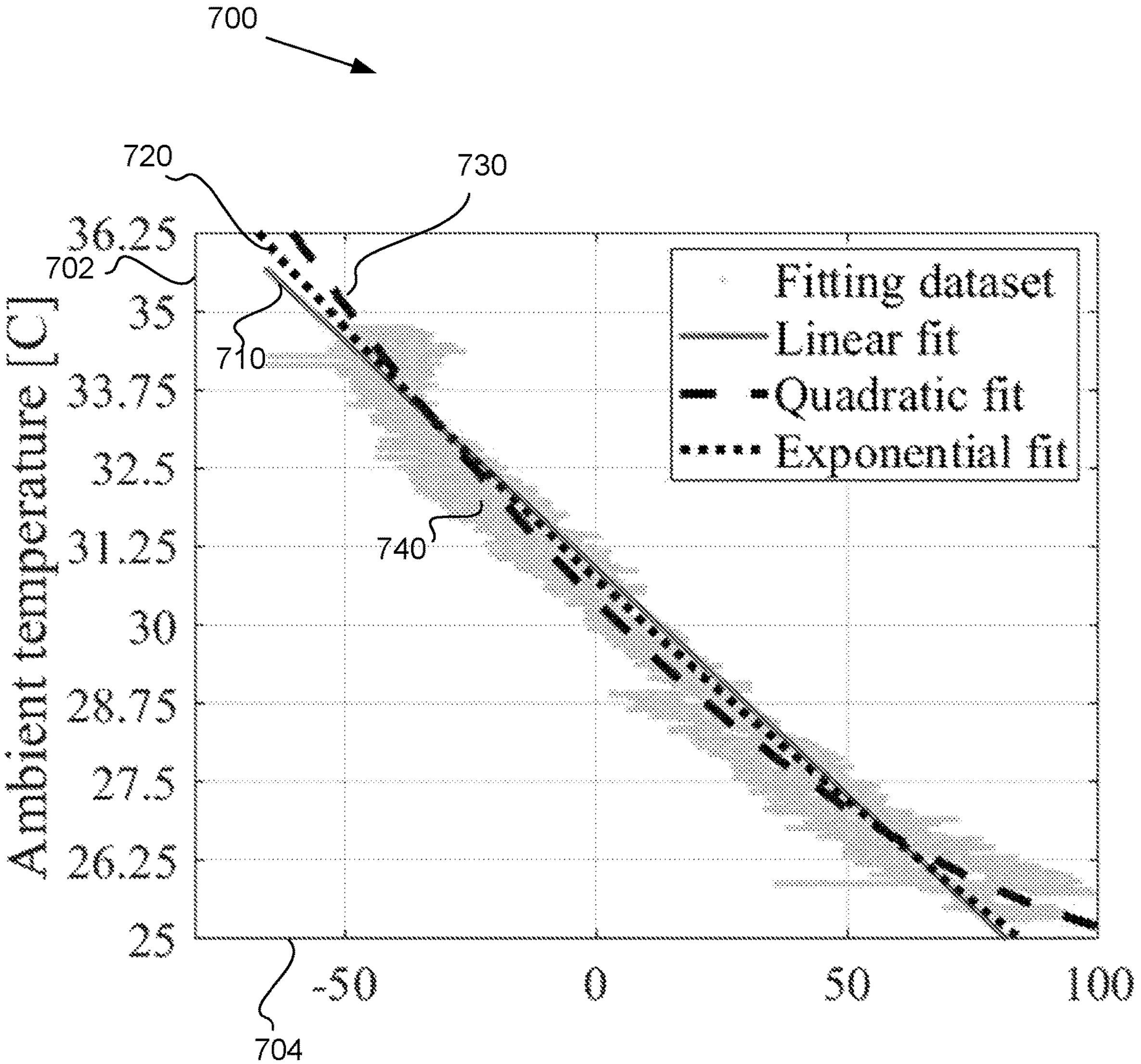
FIG. 7 shows a linear fit of CSI amplitude of subcarrier 22 and ambient temperature.

In an example, different fittings of subcarrier 22's CSI amplitude against the ambient temperature are shown in a graph 700 of FIG. 7. The graph 700 plots temperature on y-axis 702 against amplitude on x-axis 704. A linear fit model ($y=0.0721x+30.91$) is shown as a trace 710. A quadratic model ($y=0.000223x^2$ $0.0782x+30.49$) is shown as a trace 720. An exponential model 30.75*exp(0.0.00244x) is indicated as a trace 730. The fitting dataset is indicated as 740.

As shown in FIG. 7 both the linear fit 710 and the quadratic fit 720 indicate that the CSI amplitude drops by about 1/0.0721=13.9 for every rise in degree Celsius of the ambient temperature. In all three fittings 710, 720 and 730 shown in FIG. 7, the fitting residual of temperature largely falls within a 1° C. range. Among the linear (710), quadratic (720) and exponential (730) fits, the inventors found that the quadratic 720 and exponential 730 traces fit the data better than the linear model 710. Table 2 below shows a fitting root mean square error (RMSE) for each model.

CSI amplitude models were selected for subcarriers −58, 6, 22 and 58 and fitted different models to the CSI amplitude and ambient temperature reading. The particular subcarriers −58, 6, 22 and 58 were selected due to their different mean and variance response to the ambient temperature change, as shown in FIG. 5, to demonstrate the frequency-selectiveness of CSI amplitude as a function of ambient temperature.

Polynomial fittings from order 1 to 4 were applied, as well as exponential fittings with 1 and 2 exponential terms. The Root Mean Squared Error (RMSE) of each fitting and the mean RMSE of each individual subcarrier, are recorded in Table 2 below

TABLE 2

RMSE of fittings for subcarriers −58, 6, 22 and 58

| Subcarrier | −58 | 6 | 22 | 58 |
|---|---|---|---|---|
| $y = ax + b$ | 0.724 | 0.745 | 0.625 | 0.687 |
| $y = ax^2 + bx + c$ | 0.620 | 0.570 | 0.460 | 0.585 |
| $y = ax^3 + bx^2 + cx + d$ | 0.577 | 0.552 | 0.449 | 0.530 |
| $y = ax^4 + bx^3 + bx^2 + bx + e$ | 0.546 | 0.545 | 0.445 | 0.499 |
| $y = ae^{bx}$ | 0.665 | 0.668 | 0.546 | 0.627 |
| $y = ae^{ex} + ce^{dx}$ | 0.603 | 0.558 | 0.452 | 0.565 |
| Mean RMSE | 0.602 | 0.578 | 0.470 | 0.561 |

Examining the mean RMSE of each subcarrier, the frequency-selective behaviour of the subcarriers demonstrated in FIGS. 5 and 6 is exemplified in Table 2, with subcarrier 22 CSI amplitude producing the lowest RMSE. Such discrepancy in the RMSE of different fitting algorithms among different subcarriers indicates that each subcarrier has different temperature sensing performance.

For polynomial fittings, CSI amplitude and the ambient temperature follow a second order relationship, as both the second order polynomial and the second order exponential offer markedly lower RMSE than the first order fittings. Meanwhile, the third and fourth order fittings do not produce any significant improvement in RMSE.

As described above, the fitting models above employ only one subcarrier at a time, producing the RMSE as low as 0.625 among the linear fittings. Such arrangement enables the use of relatively low-complexity models, which despite lower fitting performance are nonetheless suitable for detecting changes in temperature.

In other implementations, to improve the fitting accuracy, leveraging the CSI amplitude from multiple subcarriers was found to be possible. For example, linear regression using the CSI from all subcarriers could yield an RMSE of 0.420, which is a 0.205 improvement in terms of RMSE. Nonetheless, using a regression model is magnitudes more complex than single subcarrier-based models.

As discussed in relation to FIG. 2, a fan heater 240 was used as the heat source in the experiments conducted. The fan heater 420 introduced vibration on the CSI due to the receiver 250 and the heater 240 being mechanically coupled by the cupboard. By examining a Short Time Fourier Transform (STFT) of the mean CSI amplitude across subcarriers without lowpass filtering as discussed above, the impact of the mechanical vibration was analysed. The STFT was generated by slicing the input CSI amplitude into time windows of 1 second, and applying a forward Fourier transform to each of the time windows to obtain the temporal-frequency distribution.

Figure 8:
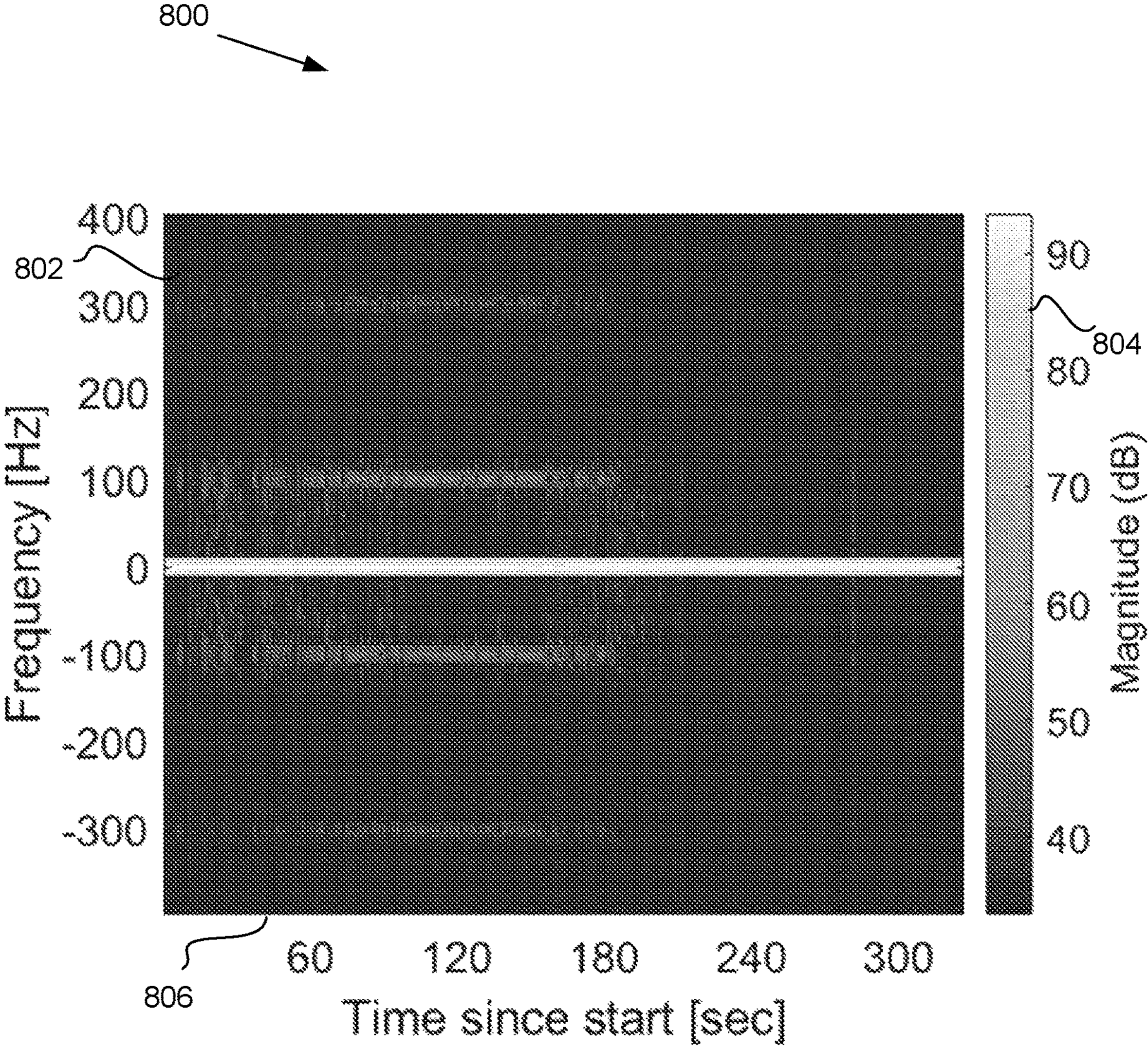
FIG. 8 shows a STFT of unfiltered CSI amplitude.

FIG. 8 shows a shading graph 800 with frequency bins on a y-axis 802 and time since experiment start on an x-axis 806. A colour coded shading magnitude scale 804 is also shown. As shown in FIG. 8 vibrations from the heater induce 100 Hz and 300 Hz response on CSI amplitude. The vibration responses are filtered out by the applied 10 Hz cutoff lowpass filter (described above) and has no impact on the fitting process.

The experiments conducted above demonstrated that WiFi CSI amplitude can be correlated to a particular channel's ambient temperature, and established that WiFi CSI amplitude across all selected carriers reduces linearly by roughly 13 per degree Celsius rise in ambient temperature in the particular hardware platform used. Establishing that individual subcarriers have different responses to changes in temperature and that particular subcarriers can be used for modelling temperature changes allows analysis of CSI amplitudes to be used to detect changes in temperature. The changes in CSI amplitudes can also be used to detect a likely cause of the temperature change. Use of CSI amplitudes to detect changes in temperature and/or a cause of a change in temperature can be implemented using trained classifiers or other machine learning techniques, as described below.

Figure 9:
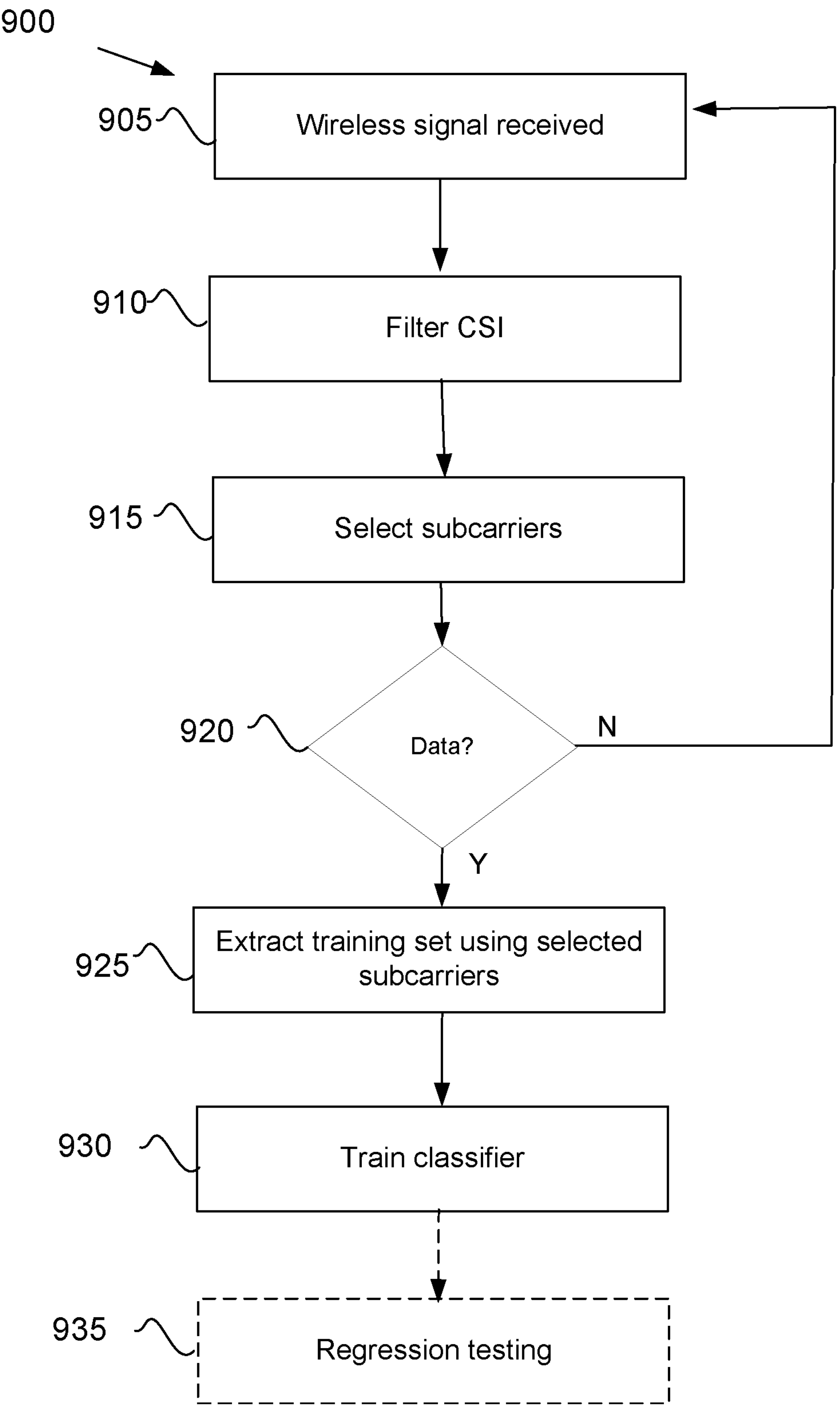
FIG. 9 shows a method of training a classifier to detect temperature change using a received WiFi signal.

FIG. 9 shows a method 900 of training a classifier to detect temperature changes. The temperature changes are detected based on the findings outlined above in relation to FIGS. 2 and 4-8.

The method 900 can be implemented on the receiving device 150, or by a computing device in communication with the receiving device 150.

Figure 3A:
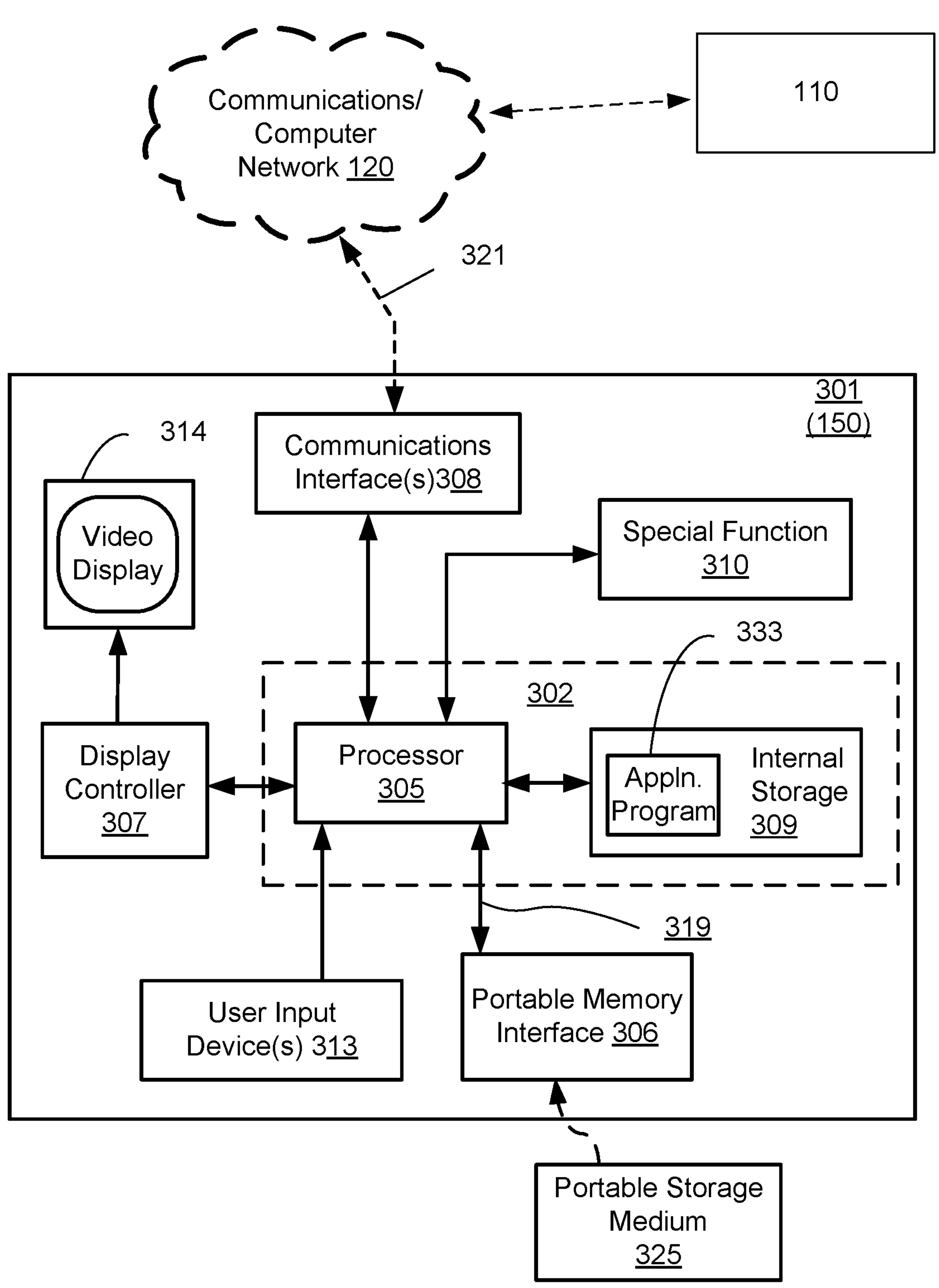
FIGS. 3A and 3B collectively form a schematic block diagram representation of an electronic device upon which described arrangements can be practised.
Figure 3B:
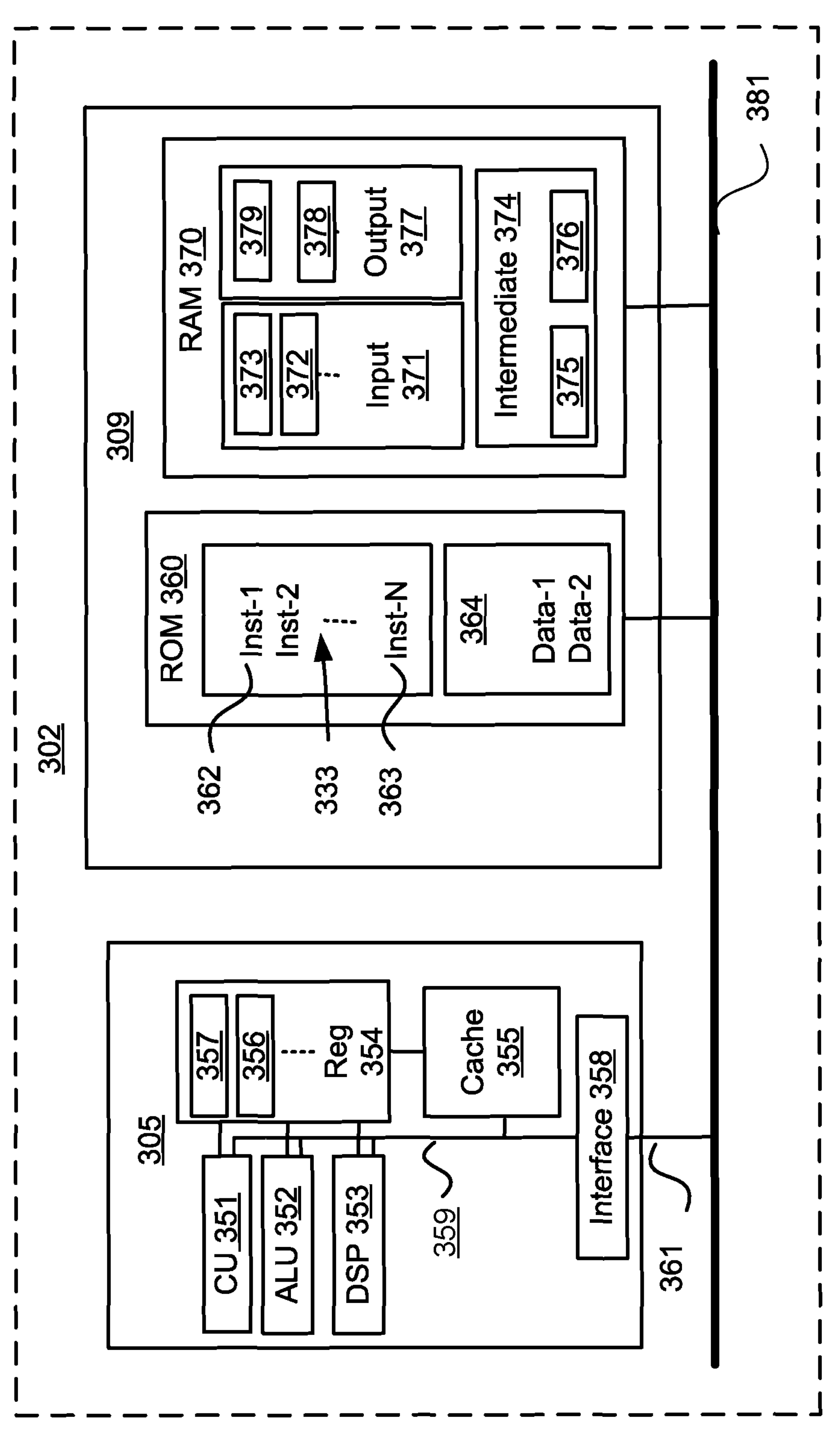

FIGS. 3A and 3B collectively form a schematic block diagram of a general purpose electronic device 301 including embedded components, upon which the methods to be described are desirably practiced. The receiver device 150 is implemented by the embedded device 301. The transmitter device 110 can operate in a similar manner. The electronic device 301 may be any device capable of receiving and extracting WiFi and associated CSI amplitudes, for example, a Wifi receiver device or another device with an embedded WiFi receiver such as mobile phone, a portable media player or the like, in which processing resources are limited. Nevertheless, the methods to be described may also be performed on higher-level devices such as desktop computers, server computers, and other such devices with significantly larger processing resources.

As seen in FIG. 3A, the electronic device 301 comprises an embedded controller 302. Accordingly, the electronic device 301 may be referred to as an "embedded device." In the present example, the controller 302 has a processing unit (or processor) 305 which is bi-directionally coupled to an internal storage module 309. The storage module 309 may be formed from non-volatile semiconductor read only memory (ROM) 360 and semiconductor random access memory (RAM) 370, as seen in FIG. 3B. The RAM 370 may be volatile, non-volatile or a combination of volatile and non-volatile memory.

The electronic device 301 in some arrangements includes a display controller 307, which is connected to a video display 314, such as a liquid crystal display (LCD) panel or the like. The display controller 307 is configured for displaying graphical images on the video display 314 in accordance with instructions received from the embedded controller 302, to which the display controller 307 is connected.

The electronic device 301 also includes user input devices 313 which are typically formed by keys, a keypad or like controls. In some implementations, the user input devices 313 may include a touch sensitive panel physically associated with the display 314 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 3A, the electronic device 301 also comprises a portable memory interface 306, which is coupled to the processor 305 via a connection 319. The portable memory interface 306 allows a complementary portable memory device 325 to be coupled to the electronic device 301 to act as a source or destination of data or to supplement the internal storage module 309. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 301 also has a communications interface 308 to permit communication of the device 301 to a computer or communications network 320 via a connection 321. In the example described the connection 321 is wireless, with the signal received from the WiFi transmitter 110 including protocols based on the standards of the IEEE 802.11 family. If the device 301 has other functions, the connection 321 can include other network connections, such as wired or wireless, for other functions and connecting to other devices. An example of a wired connection includes Ethernet. Further, an example of other wireless connections for other purposes include a Bluetooth™ type local interconnection, Infrared Data Association (IrDa) and the like.

Typically, the electronic device 301 is configured to perform a special function of receiving and processing WiFi and associated CSI signals and issuing an alarm signal. The embedded controller 302, possibly in conjunction with further special function components 310, is provided to perform that special function. Additional special functions may also be executed depending on each particular implementation. For example, the device 301 may be a mobile telephone handset. In this instance, the components 310 may represent those components required for communications in a cellular telephone environment. Where the device 301 is a portable device, the special function components 310 may represent a number of encoders and decoders of a type including Joint Photographic Experts Group (JPEG), (Moving Picture Experts Group) MPEG, MPEG-1 Audio Layer 3 (MP3), and the like.

The methods described hereinafter may be implemented using the embedded controller 302, where the processes of FIGS. 9 to 13 may be implemented as one or more software application programs 333 executable within the embedded controller 302. The electronic device 301 of FIG. 3A implements the described methods. In particular, with reference to FIG. 3B, the steps of the described methods are effected by instructions in the software 333 that are carried out within the controller 302. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 333 of the embedded controller 302 is typically stored in the non-volatile ROM 360 of the internal storage module 309. The software 333 stored in the ROM 360 can be updated when required from a computer readable medium. The software 333 can be loaded into and executed by the processor 305. In some instances, the processor 305 may execute software instructions that are located in RAM 370. Software instructions may be loaded into the RAM 370 by the processor 305 initiating a copy of one or more code modules from ROM 360 into RAM 370. Alternatively, the software instructions of one or more code modules may be pre-installed in a non-volatile region of RAM 370 by a manufacturer. After one or more code modules have been located in RAM 370, the processor 305 may execute software instructions of the one or more code modules.

The application program 333 is typically pre-installed and stored in the ROM 360 by a manufacturer, prior to distribution of the electronic device 301. However, in some instances, the application programs 333 may be supplied to the user encoded on one or more external drives (not shown) and read via the portable memory interface 306 of FIG. 3A prior to storage in the internal storage module 309 or in the portable memory 325. In another alternative, the software application program 333 may be read by the processor 305 from the network 320, or loaded into the controller 302 or the portable storage medium 325 from other computer readable media. Computer readable storage media refers to any non-transitory tangible storage medium that participates in providing instructions and/or data to the controller 302 for execution and/or processing. Examples of such storage media include a hard disk drive, a ROM or integrated circuit, USB memory, a magneto-optical disk, flash memory, or a computer readable card such as a PCMCIA card and the like, whether or not such devices are internal or external of the device 301. Examples of transitory or non-tangible computer readable transmission media that may also participate in the provision of software, application programs, instructions and/or data to the device 301 include radio or infra-red transmission channels as well as a network connection to another computer or networked device, and the Internet or Intranets including email transmissions and information recorded on Websites and the like. A computer readable medium having such software or computer program recorded on it is a computer program product.

The second part of the application programs 333 and the corresponding code modules mentioned above may be executed to implement one or more graphical user interfaces (GUIs) to be rendered or otherwise represented upon the display 314 of FIG. 3A. Through manipulation of the user input device 313 (e.g., the keypad), a user of the device 301 and the application programs 333 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 3B illustrates in detail the embedded controller 302 having the processor 305 for executing the application programs 333 and the internal storage 309. The internal storage 309 comprises read only memory (ROM) 360 and random access memory (RAM) 370. The processor 305 is able to execute the application programs 333 stored in one or both of the connected memories 360 and 370. When the electronic device 301 is initially powered up, a system program resident in the ROM 360 is executed. The application program 333 permanently stored in the ROM 360 is sometimes referred to as "firmware". Execution of the firmware by the processor 305 may fulfil various functions, including processor management, memory management, device management, storage management and user interface.

The processor 305 typically includes a number of functional modules including a control unit (CU) 351, an arithmetic logic unit (ALU) 352, a digital signal processor (DSP) 353 and a local or internal memory comprising a set of registers 354 which typically contain atomic data elements 356, 357, along with internal buffer or cache memory 355. One or more internal buses 359 interconnect these functional modules. The processor 305 typically also has one or more interfaces 358 for communicating with external devices via system bus 381, using a connection 361.

The application program 333 includes a sequence of instructions 362 though 363 that may include conditional branch and loop instructions. The program 333 may also include data, which is used in execution of the program 333. This data may be stored as part of the instruction or in a separate location 364 within the ROM 360 or RAM 370.

In general, the processor 305 is given a set of instructions, which are executed therein. This set of instructions may be organised into blocks, which perform specific tasks or handle specific events that occur in the electronic device 301. Typically, the application program 333 waits for events and subsequently executes the block of code associated with that event. Events may be triggered in response to input from a user, via the user input devices 313 of FIG. 3A, as detected by the processor 305. Events may also be triggered in response to other sensors and interfaces in the electronic device 301.

The execution of a set of the instructions may require numeric variables to be read and modified. Such numeric variables are stored in the RAM 370. The disclosed method uses input variables 371 that are stored in known locations 372, 373 in the memory 370. The input variables 371 are processed to produce output variables 377 that are stored in known locations 378, 379 in the memory 370. Intermediate variables 374 may be stored in additional memory locations in locations 375, 376 of the memory 370. Alternatively, some intermediate variables may only exist in the registers 354 of the processor 305.

The execution of a sequence of instructions is achieved in the processor 305 by repeated application of a fetch-execute cycle. The control unit 351 of the processor 305 maintains a register called the program counter, which contains the address in ROM 360 or RAM 370 of the next instruction to be executed. At the start of the fetch execute cycle, the contents of the memory address indexed by the program counter is loaded into the control unit 351. The instruction thus loaded controls the subsequent operation of the processor 305, causing for example, data to be loaded from ROM memory 360 into processor registers 354, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 333, and is performed by repeated execution of a fetch-execute cycle in the processor 305 or similar programmatic operation of other independent processor blocks in the electronic device 301.

The method 900 is implemented by execution of the software 333 on the embedded device 301 (the receiver device 150) on receiving a WiFi signal and controlled by execution of the processor 305.

The method 900 is implemented using a training set. Each element of the training set comprises a wireless communication signal (WiFi signal) received for a known temperature change. The training set associates the temperature change with the WiFi signal. The training set is typically balanced by using example readings from a random selection and having the same number of samples for each class or type pf temperature change. The method 900 starts at a receiving step 905. At step 905 the device 150 receives a first WiFi signal transmitted by the transmitting device 110 in an environment with a known temperature or temperature change. A CSI amplitude profile for the received signal is extracted from the received WiFi signal, for example by operation of a Nexmon CSI module of the special functions 310. At each implementation of the step 905, each received signal can be associated with an ambient temperature, for example as measured by the thermometer 215 in the experimental arrangement 200.

Figure 11:
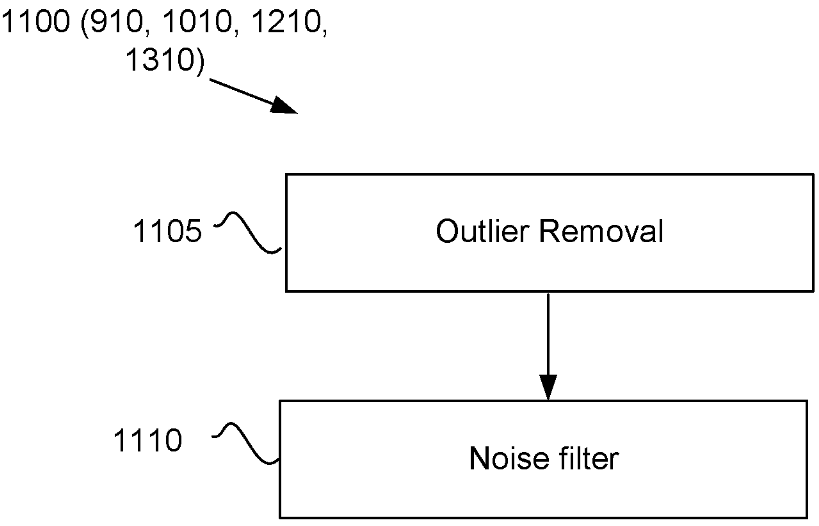
FIG. 11 shows a method of filtering a CSI amplitude signal as used in FIG. 9 or FIG. 10.

The method 900 continues from step 905 to a filtering step 910. At step 910 the processor 305 executes to apply filtering to amplitude of the CSI amplitudes extracted in step 905. FIG. 11 shows a method 1100 of filtering CSI amplitude as implemented at step 910 of the method 900. The method 1100 can be implemented as a software program executing on the application 333 controlled by execution of the processor 305. The method 1100 is applied to every subcarrier of the extracted CSI amplitudes.

The method 1100 starts with an outlier removal step 1105. The step 1105 can apply a Hempel filter with a window length of 5 to the CSI amplitude determined at step 910 for example. Alternatively, other outlier removal techniques can be used such as Butterworth filters or other filter designed for removal of hardware and environmental noise.

The method 1100 continues from step 1105 to a noise filtering step 1110. At step 1110 a noise filter is applied to the CSI amplitude signal after outliers have been removed in step 1105. For example, the step 1110 may apply a lowpass filter with a frequency of 10 Hz. Alternately, other filtering techniques may be used such as Butterworth filters or other filtering mechanisms to reduce noise. The method 1100 outputs a noise filtered CSI amplitude signal from operation of step 1110.

Reduction of noise by removal of outliers at step 1105 and filtering of noise at step 1110 represent known techniques in analysis of CSI amplitudes for purposes such as detecting human presence or movement in a space.

Returning to FIG. 9, the method 900 continues from step 910 to a subcarrier analysis step 915. At step 915 the application 333 executes to analyse the received subcarriers of the noise filtered CSI signal generated at step 910 to determine which subcarrier amplitudes vary in manner that can be modelled or fitted to reflect corresponding changes in temperature. As described in relation to FIGS. 2 and 4-8, for each received WiFi signal or packet, each of the subcarriers of the extracted CSI amplitudes is analysed and a relationship between amplitude and the known temperature change is determined. The step 915 can operate to select a subset of carriers using mathematical models. The step implements curve fitting against the known temperature change, for example using one or more of linear, quadratic, exponential fitting functions as described in relation to FIG. 7. Several subcarriers are selected based on the determined relationship between amplitude and temperature. The selection can be based on a selected fitting, for example by analysis of a combination of linear, quadratic and exponential fit as described in relation to FIG. 7. The fitting model may be based on a closest fit in terms of noise or error and/or a trade-off between accuracy and computational complexity of the fitting algorithm. Computational complexity of the fitting algorithm can be afforded higher importance in implementations for edge devices for example. In other implementations a single mathematical model can be used to select subcarriers, for example using a least squares algorithm or the like. Using methods such as linear, quadratic and exponential fitting algorithms can be computationally more efficient and more suitable for implementation on edge devices than methods such as least squares.

The method 900 continues from step 915 to a decision step 920. The step 920 determines if sufficient data has been collected to allow training a classifier to be conducted. For example, the step 920 can determine if a threshold number of readings has been taken or if readings for a required range of temperature changes have been taken. If sufficient readings have been taken ("Y" at step 920) the method 900 continues to a model extraction step 925. If insufficient readings have been taken ("N" at step 920) the method 900 returns to step 905 to receive further WiFi signals applied at other temperature changes and change rates. For example, the heat source 140 can increase and decrease temperatures over different time periods.

Iteration of the steps 905 to 920 means that the channel signal information (CSI) amplitudes are extracted for each of the wireless networking signals received at the receiver 150. Each of the plurality of subcarriers of the extracted CSI amplitudes are analysed at step 915 to determine a relationship between amplitude and temperature.

At step 925 training inputs for temperature behaviour machine learning are extracted. Effectively, a subset of the plurality of subcarriers are selected based on the determined relationship between amplitude and temperature. In some implementations the training set comprises each of the subcarrier amplitude to temperature fits selected at step 915. Effectively, a subset of the CSI subcarriers are selected based on the determined relationship between amplitude and temperature change. In other implementations further adjustments are made to the training set to account for heat experienced at the receiver device 150. In the example of FIG. 8, no effects of noise due to heating are determined. In other implementations, a temperature recorded at the device 150 or a temperature difference from a predetermined temperature recorded at the device 150 is also included as data associated with the relevant sample of the training set. Accounting for the temperature at the device can allow potential noise affects due to changing temperature of the receiver 150 to be accounted for by the classifier.

In yet other implementations, regression analysis can be conducted at the step 925 to further refine and select the identifiers to be used.

The method 900 continues from step 925 to a training step 930 which executes to train the classifier to detect a change in temperature using the CSI amplitudes of the selected subcarriers for each of the received signals and the associated in temperature. The step 930 provides the model inputs for each example to train a classifier to identify temperature changes, typically in terms of rate of temperature change. The classifier may be any suitable machine learning classifier such as a support vector machine (SVM), a convolutional neural network (CNN), long short term memory (LSTM), or the like. Step 930 trains the classifier to detect a rate of change in temperature using the CSI amplitudes of the selected subcarriers for each of the received signals and the associated temperature. Known evaluation measures such as performance measures and cross validation techniques can be used.

In some implementations the method 900 ends at step 930. In other implementations the method 900 continues from step 930 to a regression testing step 935. The step 935 can implement regression testing using a regression model, for example linear regression using the CSI from all subcarriers, to refine operation of the classifier using known regression techniques.

Figure 12:
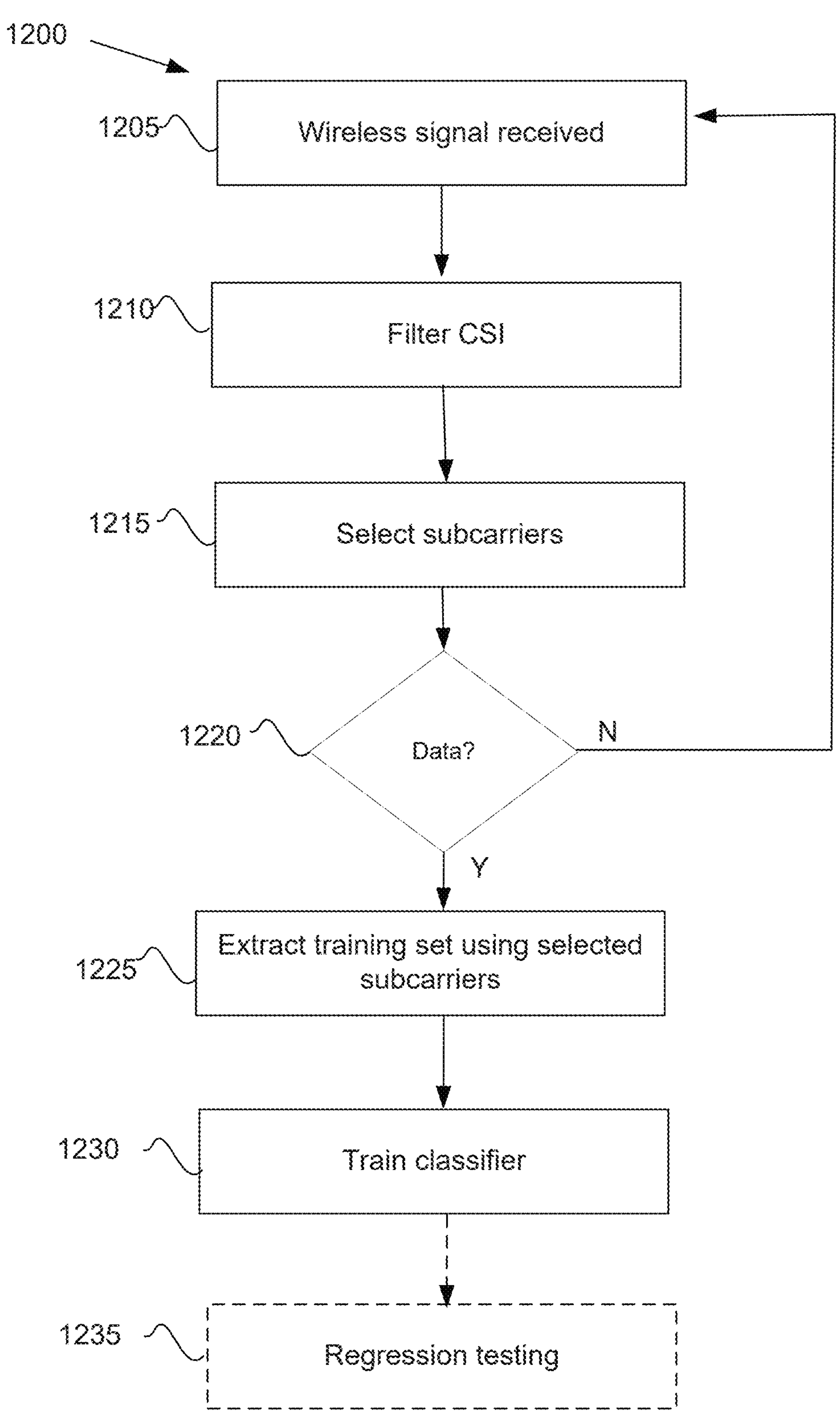
FIG. 12 shows a method of training a classifier to detect a cause of temperature change using a received WiFi signal.

The arrangements described can also be used to train a classifier to detect a cause of an environmental temperature change. FIG. 12 shows a method 1200 of training a classifier to detect a cause of an environmental change associated with temperature. The example of FIG. 12 describes training a classifier to detect presence of fire by detecting temperature changes. In other implementations, the classifier may be detected to obtain other environmental causes of temperature change for which a training set can be generated, for example operation of an exhaust fan, operation of a compressor or other types of machinery, data centre operations or the like. The temperature changes are detected based on the findings outlined above in relation to FIGS. 2 and 4-8.

The method 1200 can be implemented by execution of the software 333 on the embedded device 301 (the receiver device 150) on receiving a WiFi signal and controlled by execution of the processor 305.

The method 1200 is implemented using a training set. Each element of the training set comprises a WiFi signal received for a known cause of temperature change and indication of whether the cause was present or not. The training set is typically balanced by using example readings from a random selection and having the same number of samples for each class or type of temperature change. For example, fire typically causes steep gradients in temperature change. The training set associates an indicator for presence or absence of fire with each CSI measurement based on real world examples.

The method 1200 starts at a receiving step 1205 which operates in a similar manner to the step 905. At step 1205 the device 150 receives a first WiFi signal of the training set transmitted by the transmitting device 110 in an environment with a known condition, in the example described presence or absence of fire. A CSI amplitude profile for the received signal is extracted from the received WiFi signal, for example by operation of a Nexmon CSI module of the special functions 310. At each implementation of the step 905, each received signal can be associated with a change in ambient temperature, for example as measured by the thermometer 215 in the experimental arrangement 200, and presence or absence of fire.

The method 1200 continues from step 1205 to a filtering step 1210 which operates in a similar manner to the step 910. At step 1210 the processor 305 executes to apply filtering to amplitude of the CSI amplitudes extracted in step 1205. FIG. 11 shows a method 1100 of filtering CSI amplitude as implemented at step 1210 of the method 1200. The method 1100 applies the outlier removal step 1105 as described above. The method 1100 continues to execute the noise filtering step 1110 and outputs a noise filtered CSI amplitude signal.

Returning to FIG. 12, the method 1200 continues from step 1210 to a subcarrier analysis step 1215 which operates in a similar manner to the step 915. At step 1215 the application 333 executes to analyse the subcarriers of the noise filtered CSI signal generated at step 1210 to determine which subcarrier amplitudes vary in manner that can be modelled or fitted to reflect corresponding changes in temperature. As described in relation to FIGS. 2 and 4-8, for each received WiFi signal or packet, each of the subcarriers of the extracted CSI amplitudes is analysed and a relationship between amplitude and temperature is determined. The step 1215 can operate to implement curve fitting against the known temperature change, for example using one or more of quadratic and exponential fitting functions as described in relation to FIG. 7. Several subcarriers are selected based on the determined relationship between amplitude and temperature. The selection can be based on a selected fitting, for example by analysis of a combination of linear, quadratic and exponential fit as described in relation to FIG. 7. The fitting model may be based on a closest fit in terms of noise and/or a trade-off between accuracy and computational complexity of the fitting algorithm. Computational complexity of the fitting algorithm can be afforded higher in implementations for edge devices for example. In other implementations a single mathematical model can be used to select subcarriers, for example using a least squares algorithm or the like. Using methods such as linear, quadratic and exponential fitting algorithms can be computationally more efficient and more suitable for implementation on edge devices than methods such as least squares.

The method 1200 continues from step 1215 to a decision step 1220 which operates in a similar manner to the step 920. The step 1220 determines if sufficient data has been collected to allow training a classifier to be conducted. For example, the step 1220 can determine if a threshold number of readings has been taken or if readings for a required range of instances with or without a cause (fire) have been taken. If sufficient readings have been taken ("Y" at step 1220) the method 1200 continues to a model extraction step 1225 which operates in a similar manner to the step 925. If insufficient readings have been taken ("N" at step 1220) the method 1200 returns to step 1205 to receive further WiFi signals received with known presence or absence of fire. The training set is typically balanced by using example readings from a random selection and having the same number of samples for each class.

At step 1225 final training inputs for fire behaviour are extracted. Effectively, a subset of the plurality of subcarriers are selected based on the determined relationship between amplitude and temperature. In some implementations the training set comprises each of the subcarrier amplitude to temperature fits selected at step 1215. Effectively, a subset of the CSI subcarriers are selected based on the determined relationship between amplitude and temperature. In other implementations further adjustments are made to the training set to account for heat experienced at the receiver device 150. In the example of FIG. 8, no effects of noise due to heating are determined. In other implementations, a temperature recorded at the device 150 or a temperature difference from a predetermined temperature recorded at the device 150 is also included as data associated with the relevant sample of the training set. Accounting for the temperature at the device can allow potential noise affects due to changing temperature of the receiver 150 to be accounted for by the classifier. In yet other implementations, regression analysis can be conducted at the step 925 to further refine and select the identifiers to be used The method 1200 continues from step 1225 to a training step 1230 which operates in a similar manner to the step 930. The step 1230 provides the model inputs for each example to train a classifier. The classifier may be any suitable machine learning classifier such as a support vector machine (SVM), a neural network or the like. Step 1230 trains the classifier to detect a change in temperature using the CSI amplitudes of the selected subcarriers for each of the received signals and the associated temperature using known training techniques. Known evaluation measures such as performance measures and cross validation techniques can be used.

In some implementations the method 1200 ends at step 1230. In other implementations the method 1200 continues from step 1230 to a regression testing step 1235. The step 1235 can implement regression testing using a regression model, for example linear regression using the CSI from all subcarriers, to refine operation of the classifier using known regression techniques Fire typically causes relatively high gradient temperature changes. The associated high gradient of temperature change associated with fire allows use of temperature changes to detect fire. In other implementations, the training set can relate to presence and absence of different factors causing temperature change. In other example implementations, the training set can relate to causes associated with causing temperature changes and the method 1200 implemented accordingly. For example, machinery such as an exhaust fan switching on and ramping up operation can cause changes in temperature and temperature gradients. An associated training set can relate to CSI samples taken when an exhaust fan is known to be on or switching on/off in a given space.

Figure 10:
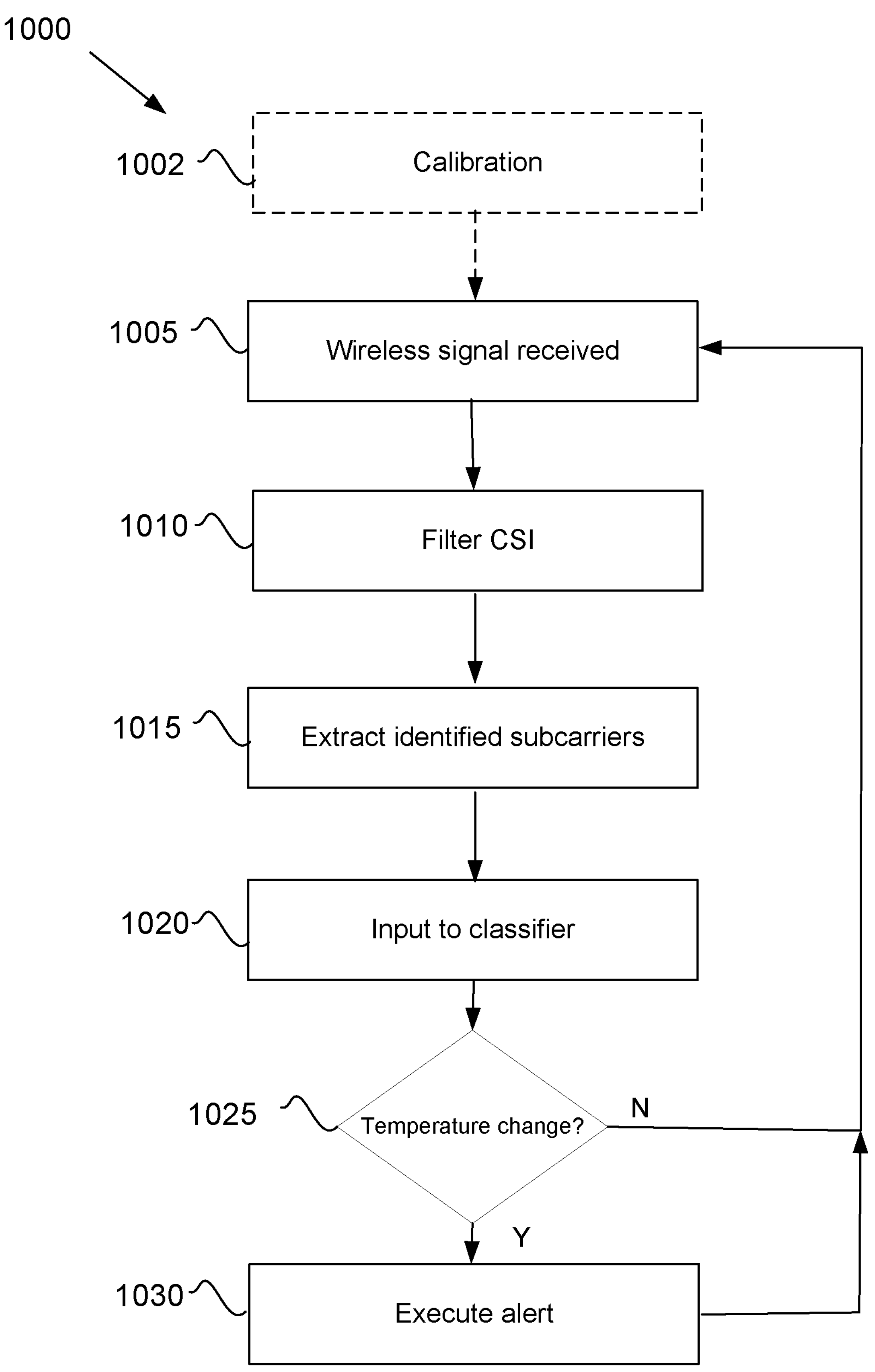
FIG. 10 shows a method of detecting temperature using the trained classifier of FIG. 9.

FIG. 10 shows a method 1000 of detecting temperature change using a classifier trained using the method 900. The method 1000 is implemented using the system 100, where the receiver 150 operates as described with reference to FIG. 3A. The method 1000 can be implemented by execution of the software 333 on the processor 305.

In some implementations the method 1000 begins at a calibration step 1002. The calibration step 1002 is optional or may not be implemented in all scenarios, so is shown in broken lines. The step 1002 can be executed to account for different applications defined based on device and frequency settings. The calibration step may be executed when the received device 150 is first used to detect temperature changes or can initiated by a user, for example by selecting a "calibrate" option of an interface presented by execution of the software application 333. The calibration step operates to identify which subcarriers of CSI amplitudes are to be used. The subcarriers can be identified using a number of techniques, for example accessing a remote look-up table listing different subcarriers for different version of wireless communication standards or devices, performing a test reading sequence, downloading a set of subcarrier identifiers, or the like. The calibration allows the subcarriers to be updated based on further training or regression analysis after an initial implementation of the method 900, or implementation-specific training. Once calibration executed at step 1002, the selected subcarriers are used in execution of the method 1000 until a further calibration is performed.

If calibration is used, the method 1000 continues from step 1002 to a receiving step 1005. If calibration is not used, the method 1000 starts at a receiving step 1005. At step 1005 the device 150 receives a WiFi signal transmitted by the transmitting device 110. A CSI profile for the received signal is determined from the received WiFi signal, for example by operation of a Nexmon CSI module of the special functions 310.

The method 1000 continues from step 1005 to a filtering step 1010. At step 1010 the processor 305 executes to apply filtering to amplitude of the CSI signals or profiles extracted in step 1005. For example, the method 1100 of is implemented at step 1010. The method 1100 performs step 1105 to remove outliers and progresses to execute step 1110 to filter noise from the CSI amplitude signals. The step 1110 outputs a noise reduced CSI amplitude signal for all subcarriers.

Returning to FIG. 10, the method 1000 continues from step 1010 to a subcarrier extraction set 1015. At step 1015 a set of subcarriers is selected based upon a correlation of change in amplitude of the subcarrier to a change in ambient temperature in the area surrounding the receiver device 150. The selection is based on a previously determined relationship between amplitude and temperature for the subcarriers. In one implementation a pre-existing list of subcarriers is selected at step 1015. The pre-existing list of subcarriers may be derived from step 915 stored in the memory 309 or stored in a memory of an external device, for example selected based on a fitting algorithm implemented at training. In other implementations, the subcarriers are be selected based on the calibration step 1002. Step 1015 operates to select a subset of subcarriers from the full set of CSI subcarriers based on a previously determined relationship between amplitude and temperature. The relationship can be based on the training executed at the method 900 or based on updated or implementation-specific analysis, or the calibration step.

The method 1000 continues from step 1015 to a classification step 1020. At the step 1020 inputs are provided to the classifier trained in step 930 of the method 900. The classifier can for example be stored in the memory 309 of the device 301. The inputs to the classifier are at least the CSI subcarrier amplitude signals selected at step 1015. In some implementations, if the classifier was trained using temperature readings from a receiver, a temperature change reading from the receiver device 150 itself is also input to the trained classifier to account for changes in temperature in the WiFi receiver 150. The classifier outputs a decision based on the inputs.

The method 1000 continues from step 1020 to a check step 1025. At step 1025 the application 333 executes to determine if the output from step 1020 indicates change in temperature to be reported, for example a change in temperature outside a predetermined threshold. If the output indicates a change in temperature ("Y" at step 1025) the method 1000 continues to an alert step 1030. If the output indicates fire is not present ("N" at step 1025) the method 1000 returns to step 1005 to receive a next transmission.

At step 1030 the application 333 executes to transmit an alert signal to indicate a change in temperature. The alert signal may relate to one or more of generation of a noise, illumination of an optical signal or sending of a communication. Sending a communication can include transmission of a message such as an email or an SMS message to a user device such as a smartphone identifying the receiver device 150 and/or an associated location.

Figure 13:
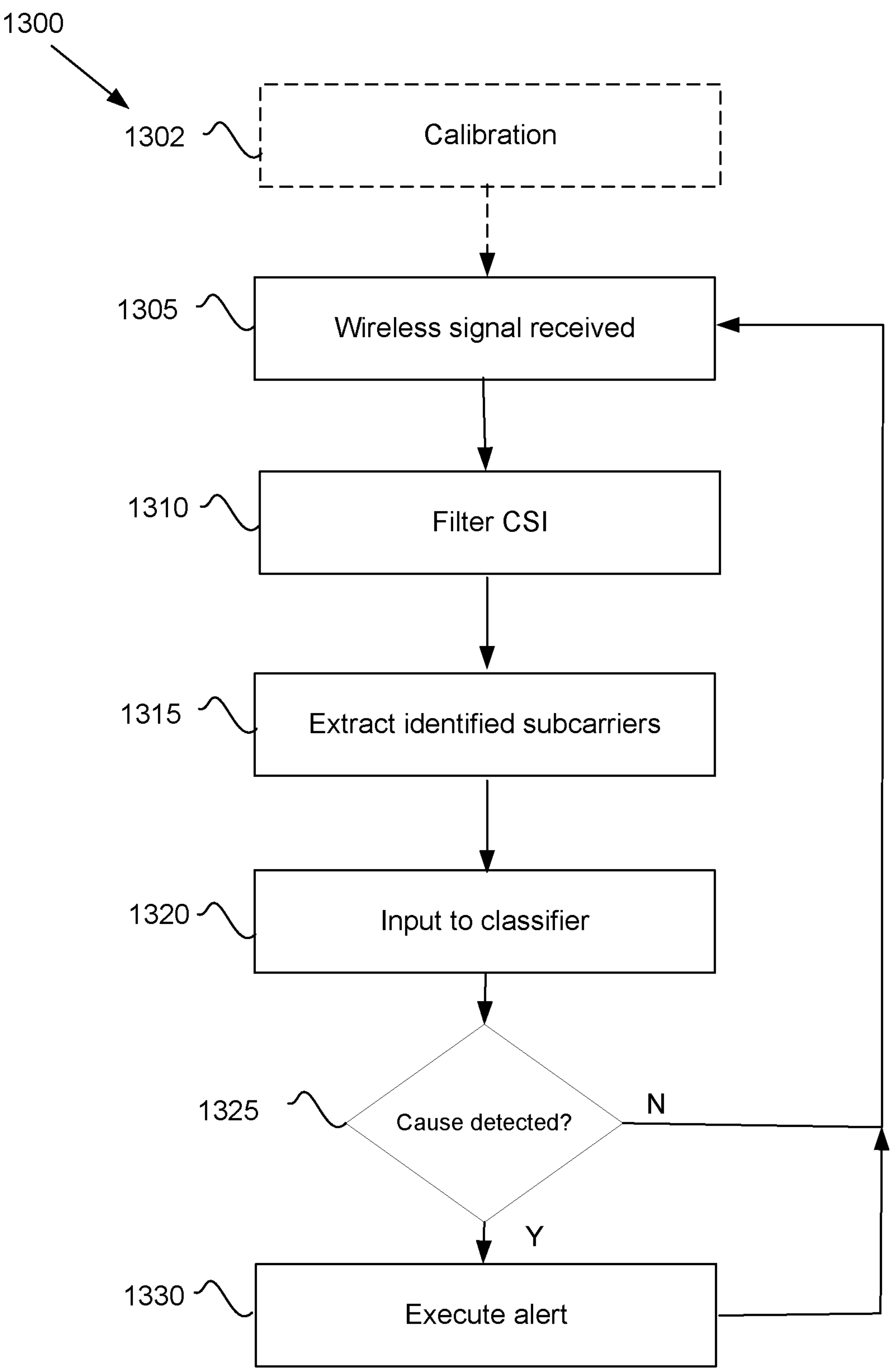
FIG. 13 shows a method of detecting a cause of temperature change temperature using the trained classifier of FIG. 12.

FIG. 13 shows a method 1300 of detecting a cause or source of a temperature change using a classifier trained using the method 1200. The method 1300 is implemented using the system 100, where the receiver 150 operates as described with reference to FIG. 3A. The method 1300 can be implemented by execution of the software 333 on the processor 305.

In some implementations the method 1300 begins at a calibration step 1302 which operates in a similar manner to the step 1002. The calibration step 1302 is optional or may not be implemented in all scenarios, so is shown in broken lines. The step 1302 can be executed to account for different applications defined based on device and frequency settings. The calibration step may be executed when the received device 150 is first used to detect temperature changes or can initiated by a user, for example by selecting a "calibrate" option of an interface presented by execution of the software application 333. The calibration step operates to identify which subcarriers of CSI amplitudes are to be used. The subcarriers can be identified using a number of techniques, for example accessing a remote look-up table listing different subcarriers for different version of wireless communication standards or devices, performing a test reading sequence, downloading a set of subcarrier identifiers, or the like. Once calibration executed at step 1302, the selected subcarriers are used in execution of the method 1300 until a further calibration is performed.

If calibration is used, the method 1300 continues from step 1302 to a receiving step 1305 which operates in a similar manner to the step 1005. If calibration is not used, the method 1300 starts at a receiving step 1305. At step 1305 the device 150 receives a WiFi signal transmitted by the transmitting device 110. A CSI profile for the received signal is determined from the received WiFi signal, for example by operation of a Nexmon CSI module of the special functions 310.

The method 1300 continues from step 1305 to a filtering step 1310 which operates in a similar manner to the step 1310. At step 1310 the processor 305 executes to apply filtering to amplitude of the CSI signals extracted in step 1305. For example, the method 1100 of is implemented at step 1310. The method 1100 performs step 1105 to remove outliers and progresses to execute step 1100 to filter noise from the CSI amplitude signals. The step 1010 outputs a noise reduced CSI amplitude signal for all subcarriers.

Returning to FIG. 13, the method 1300 continues from step 1310 to a subcarrier extraction set 1315 which operates in a similar manner to the step 1015. At step 1315 a set of subcarriers is selected based upon a correlation of change in amplitude of the subcarrier to a change in ambient temperature in the area surrounding the receiver device 150. The selection is based on a previously determined relationship between amplitude and temperature for the subcarriers. In one implementation a pre-existing list of subcarriers is selected at step 1315. The pre-existing list of subcarriers may be derived from operation of step 1215, stored in the memory 309 or stored in a memory of an external device. In other implementations, the subcarriers are selected based on the calibration step 1302. Step 1315 operates to select a subset of subcarriers from the full set of CSI subcarriers based on a previously determined relationship between amplitude and temperature. The relationship can be based on the training executed at the method 1000 or based on updated or implementation-specific analysis, or the calibration step.

The method 1300 continues from step 1315 to a classification step 1320 which operates in a similar manner to the step 1020. At the step 1320 inputs are provided to the classifier trained in step 1230 of the method 1200. The classifier can for example be stored in the memory 309 of the device 301. The inputs to the classifier are at least the CSI subcarrier amplitude signals selected at step 1315. In some implementations a temperature reading from the receiver device itself is also input to the trained classifier to account for changes in temperature in the WiFi receiver 150. The classifier outputs a decision based on the inputs.

The method 1300 continues from step 1320 to a check step 1325. At step 1325 the application 333 executes to determine if the output from step 1320 indicates presence of the environmental cause of temperature change for which the classifier is trained, for example presence of fire. If the output indicates positive detections such as presence of fire ("Y" at step 1025), the method 1300 continues to an alert step 1330. If the output means the cause is not detected, for example fire is not present ("N" at step 1325) the method 1300 returns to step 1305 to receive a next transmission.

At step 1330 the application 333 executes to transmit an alert or alarm signal to indicate a causing factor for temperature change, such as presence of fire. The alarm signal may relate to one or more of generation of a noise, illumination of an optical signal or sending of a communication. Sending a communication can include transmission of a message such as an email or an SMS message to a user device such as a smartphone identifying the receiver device 150 and/or an associated location. In other arrangements sending an alarm communication can include sending a signal to an emergency services server.

INDUSTRIAL APPLICABILITY

The arrangements described are applicable to the computer and data processing industries and particularly for the wireless communication industries. The claimed invention is also useful in safety industries such as fire detection and safety-conscious, environmental-aware industries such as mining. The arrangements described may be particularly suitable for data centres, which are vulnerable to temperature changes and/or fire and where wireless networking equipment is often heavily used. The arrangements described can be used in environments where WiFi receivers can receive a wireless signal with sufficient signal strength to accurately extract CSI information, including but not limited to data centres, indoor rooms, tunnels, ducts and the like.

Compared to RSSI sensing, CSI captures multipath fading with finer granularity and less noise, allowing for the more robust WiFi sensing than previous solutions. Use of CSI signals to determine temperature changes allows common devices used for wireless communications to provide an additional low-cost method of detecting temperature changes that can be used in applications such as fire detection, safety monitoring and the like without requiring installation of specialist equipment. As also described, analysis of subcarriers to identify changes in temperature can also be used to detect causes of temperature changes such as presence of fire without use of a specialised smoke detector, or as an inexpensive complement to a traditional smoke detector or alarm.

In analysing profiles of each subcarrier and selecting subcarriers with a response that can be modelled with respect to temperature change the claimed invention allows sufficiently accurate temperate detection to allow fire to be detected. In removing subcarriers which may have a spurious or noisy response to temperature changes the accuracy of detecting temperature changes can be improved. Using low complexity curve fitting techniques, at steps 915 and 1215 can allow the frequency selectiveness of the CSI magnitudes to be exploited in a manner that is suitable for implementation on commodity hardware or edge devices.

The arrangements described can be particularly suited to detecting presence of fire by analysis of changes in temperature rather than presence of smoke or other atmospheric particles. Detecting changes in temperature may in some instances be advantageous to detecting smoke or may provide a complementary confirmation or verification of a smoke signal.

The arrangements described is suitable for implemented using edge devices or commodity hardware, thereby allowing a fire detection system that uses readily available equipment.

The foregoing describes only some embodiments of the present invention, and modifications and/or changes can be made thereto without departing from the scope and spirit of the invention, the embodiments being illustrative and not restrictive.

In the context of this specification, the word “comprising” means “including principally but not necessarily solely” or “having” or “including”, and not “consisting only of”. Variations of the word “comprising”, such as “comprise” and “comprises” have correspondingly varied meanings.

The invention claimed is:

1. A method of detecting an environmental cause of a change in temperature in a closed space, the method comprising:

extracting channel signal information (CSI) amplitudes for a wireless networking signal received at a wireless receiver device;

selecting, from a plurality of subcarriers of the extracted CSI amplitudes, a subset of subcarriers, the selection based on a previously determined relationship between an amplitude and a temperature for each of the plurality of subcarriers; and providing the CSI amplitudes of the selected subcarriers to a classifier trained to determine whether the environmental cause is present.

2. The method according to claim 1, wherein the subset of subcarriers are selected based on a fitting algorithm.

3. The method according to claim 1, wherein the subset of subcarriers is selected based on a calibration step.

4. The method according to claim 1, wherein the subset of subcarriers is selected based on one of accessing a remote look-up table listing different subcarriers for different version of wireless communication standards or devices, performing a test reading sequence, and downloading a set of subcarrier identifiers.

5. The method according to claim 1, wherein the environmental cause for the change in temperature is presence of fire.

6. The method according to claim 1, wherein the environmental cause for the change in temperature is one of operation of an exhaust fan, operation of a compressor or data centre operations.

7. The method according to claim 1, wherein the indoor closed space is one of a data centre, an indoor room, a tunnel and a duct.

8. The method according to claim 1, further comprising transmitting an alarm signal indicating the environmental cause for the change in temperature.

9. The method according to claim 1, further comprising providing a temperature reading from the wireless receiver device receiving the wireless networking signal to the classifier to determine whether the environmental cause is present.

10. A system for detecting an environmental cause of a change in temperature in a closed space, the system comprising:

a wireless receiver device;

a processor; and a memory storing a trained classifier and instructions executable on the processor to implement a method comprising:

extracting channel signal information (CSI) amplitudes for a wireless networking signal received at the wireless receiver device;

selecting, from a plurality of subcarriers of the extracted CSI amplitudes, a subset of subcarriers, the selection based on a previously determined relationship between an amplitude and a temperature for each of the plurality of subcarriers; and providing the CSI amplitudes of the selected subcarriers to the trained classifier determine the environmental cause.

11. The system according to claim 10, wherein the subset of subcarriers are selected based on a fitting algorithm.

12. The system according to claim 10, wherein the subset of subcarriers is selected based on a calibration step.

13. The system according to claim 10, wherein the subset of subcarriers is selected based on one of accessing a remote look-up table listing different subcarriers for different version of wireless communication standards or devices, performing a test reading sequence, and downloading a set of subcarrier identifiers.

14. The system according to claim 10, wherein the environmental cause for the change in temperature is presence of fire.

15. The system according to claim 10, wherein the environmental cause for the change in temperature is one of operation of an exhaust fan, operation of a compressor or data centre operations.

16. The system according to claim 10, wherein the closed space is one of a data centre, an indoor room, a tunnel and a duct.

17. The system according to claim 10, wherein the method further comprises transmitting an alarm signal indicating the environmental cause for the change in temperature.

18. The system according to claim 10, wherein the method further comprises providing a temperature reading from the wireless receiver device receiving the wireless networking signal to the classifier to determine whether the environmental cause is present.

19. The system according to claim 10, wherein the wireless receiver device comprises the processor and the memory.

20. A non-transitory computer readable medium computer-readable storage medium which stores a program for executing a method of method of detecting an environmental cause of a change in temperature in a closed space, the method comprising:

extracting channel signal information (CSI) amplitudes for a wireless networking signal received at a wireless receiver device;

selecting, from a plurality of subcarriers of the extracted CSI amplitudes, a subset of subcarriers, the selection based on a previously determined relationship between an amplitude and a temperature for each of the plurality of subcarriers; and providing the CSI amplitudes of the selected subcarriers to a classifier trained to determine whether the environmental cause is present.

* * * * *